US012561980B2

(12) United States Patent (10) Patent No.: US 12,561,980 B2

Furuki et al. (45) Date of Patent: Feb. 24, 2026

(54) NUISANCE DEGREE-DECISION SYSTEM, INFORMATION PRESENTATION SYSTEM, INFORMATION PRESENTATION METHOD, AND COMPUTER READABLE MEDIUM

(71) Applicant: Mitsubishi Electric Corporation, Tokyo (JP)

(72) Inventors: Ichiro Furuki, Tokyo (JP); Yasunori Tsubaki, Tokyo (JP); Junya Miyagi, Tokyo (JP); Atsuki Tachibana, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 301 days.

(21) Appl. No.: 18/174,288

(22) Filed: Feb. 24, 2023

(65) Prior Publication Data

US 2023/0222806 A1    Jul. 13, 2023

Related U.S. Application Data

(63) Continuation of application No. PCT/JP2020/039981, filed on Oct. 23, 2020.

(51) Int. Cl.
| | |
|---|---|
| *G06V 20/52* | (2022.01) |
| *G06V 40/10* | (2022.01) |
| *G06V 40/16* | (2022.01) |

(52) U.S. Cl.
CPC ............ *G06V 20/52* (2022.01); *G06V 40/103* (2022.01); *G06V 40/174* (2022.01)

(58) Field of Classification Search
None
See application file for complete search history.

(56) References Cited

U.S. PATENT DOCUMENTS

2014/0241328 A1   8/2014   Kikuchi
2018/0040223 A1*   2/2018   Bodi ...................... G08B 21/18
(Continued)

FOREIGN PATENT DOCUMENTS

DE   20 2014 009 166 U1   2/2015
DE   10 2018 200 097 A1   7/2019
(Continued)

OTHER PUBLICATIONS

Schimkowsky, Christoph. "Managing passenger etiquette in Tokyo: between social control and customer service." Mobilities 17.6 (2022): 932-950. (Year: 2022).*
(Continued)

*Primary Examiner* — Michelle M Entezari Hausmann
(74) *Attorney, Agent, or Firm* — Birch, Stewart, Kolasch & Birch, LLP

(57) ABSTRACT

An action detection unit (110) analyzes monitor data obtained by monitoring a monitoring place, and detects a relevant action performed at the monitoring place and having a characteristic that is common to a violating action. A situation analysis unit (120) analyzes visual data obtained by photographing the monitoring place, and detects a surrounding situation of an action position equivalent to a position where the relevant action was performed. The situation analysis unit decides a nuisance degree of the relevant action on a basis of the surrounding situation. A presentation control unit (130) determines an alert level on a basis of the nuisance degree. The presentation control unit presents presentation information corresponding to the alert level with using a presentation apparatus installed at the monitoring place.

19 Claims, 29 Drawing Sheets

(56) References Cited

U.S. PATENT DOCUMENTS

| | | | |
|---|---|---|---|
| 2019/0130337 A1* | 5/2019 | Nafus | G06Q 10/06398 |
| 2020/0050872 A1 | 2/2020 | Ikeda | |
| 2020/0050873 A1 | 2/2020 | Ikeda | |
| 2020/0053320 A1* | 2/2020 | Mor | H04N 7/18 |
| 2020/0097743 A1 | 3/2020 | Shiga et al. | |
| 2020/0184228 A1 | 6/2020 | Ikeda | |
| 2021/0114600 A1* | 4/2021 | Uno | G06V 20/52 |
| 2021/0193172 A1 | 6/2021 | Shionozaki | |
| 2022/0130146 A1* | 4/2022 | Song | G06T 7/70 |
| 2022/0229488 A1* | 7/2022 | Akimoto | G06V 40/174 |
| 2023/0224339 A1* | 7/2023 | Hixson | H04L 65/403 |
| | | | 348/14.08 |
| 2023/0330385 A1* | 10/2023 | Winckler | A61M 21/02 |

FOREIGN PATENT DOCUMENTS

| | | | |
|---|---|---|---|
| JP | 9-288609 A | | 11/1997 |
| JP | 2003-143594 A | | 5/2003 |
| JP | 2009-15519 A | | 1/2009 |
| JP | 2009-56011 A | | 3/2009 |
| JP | 2009-302598 A | | 12/2009 |
| JP | 2010-237971 A | | 10/2010 |
| JP | 2011-186788 A | | 9/2011 |
| JP | 2015-23459 A | | 2/2015 |
| JP | 2015-108854 A | | 6/2015 |
| JP | 2017-49884 A | | 3/2017 |
| JP | 2018-82281 A | | 5/2018 |
| JP | 2018112831 A | * | 7/2018 |
| JP | 2020-3935 A | | 1/2020 |
| JP | 2020-52471 A | | 4/2020 |
| JP | 2020-61644 A | | 4/2020 |
| WO | WO 2013/073473 A1 | | 5/2013 |
| WO | WO 2013/121737 A1 | | 8/2013 |
| WO | WO 2017/038129 A1 | | 3/2017 |
| WO | WO2018/025831 A1 | | 6/2019 |
| WO | WO 2020/050134 A1 | | 3/2020 |

OTHER PUBLICATIONS

Huang, Baoxiang, Zhenkuan Pan, and Binsen Zhang. "A virtual perception method for urban noise: The calculation of noise annoyance threshold and facial emotion expression in the virtual noise scene." Applied Acoustics 99 (2015): 125-134. (Year: 2015).*

JP2018112831A Machine Translation (Year: 2018).*

Japanese Office Action for Japanese Application No. 2023-031471, dated Mar. 19, 2024, with English translation.

Japanese Office Action for Japanese Application No. 2023-031482, dated Aug. 20, 2024, with English translation.

Japanese Office Action for Japanese Application No. 2023-031476, dated May 21, 2024, with an English translation.

International Search Report (PCT/ISA/210) issued in PCT/JP2020/039981, dated Nov. 17, 2020.

Japanese Office Action for Japanese Application No. 2023-031476, dated Feb. 13, 2024, with English translation.

Japanese Office Action for Japanese Application No. 2023-031482, dated Feb. 27, 2024, with English translation.

Japanese Office Action for Japanese Application No. 2023-031504, dated Feb. 13, 2024, with English translation.

Chinese Office Action and Search Report for Chinese Application No. 202080106235.2, dated Apr. 18, 2025, with English translation.

German Office Action for German Application No. 11 2020 007 721.7, dated Nov. 17, 2025, with English translation.

* cited by examiner

Figure 2:
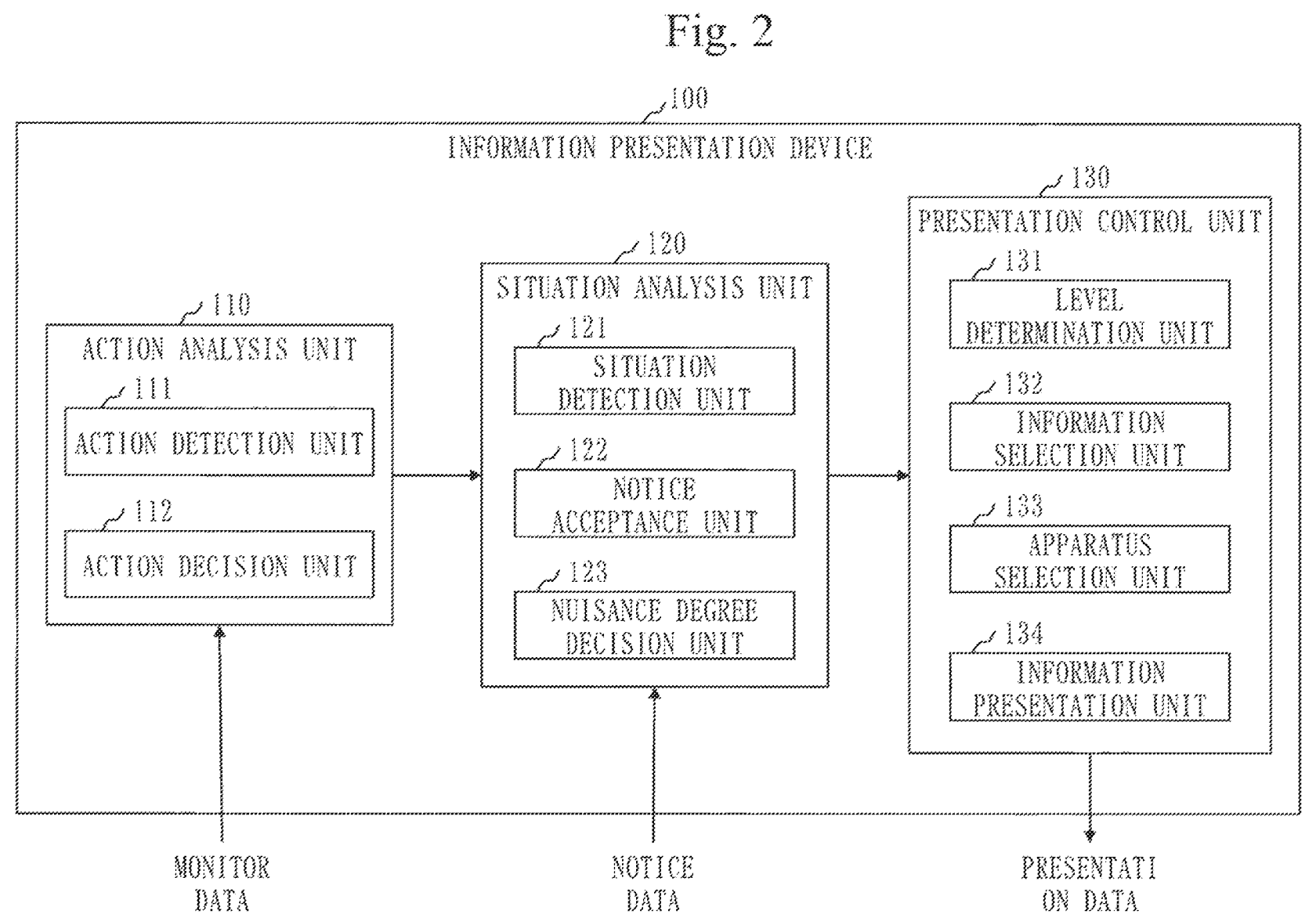

INFORMATION PRESENTATION DEVICE

130

PRESENTATION CONTROL UNIT

131 — LEVEL DETERMINATION UNIT

132 — INFORMATION SELECTION UNIT

133 — APPARATUS SELECTION UNIT

134 — INFORMATION PRESENTATION UNIT

PRESENTATION DATA

120

SITUATION ANALYSIS UNIT

121 — SITUATION DETECTION UNIT

122 — NOTICE ACCEPTANCE UNIT

123 — NUISANCE DEGREE DECISION UNIT

NOTICE DATA

110

ACTION ANALYSIS UNIT

111 — ACTION DETECTION UNIT

112 — ACTION DECISION UNIT

MONITOR DATA

Fig. 3

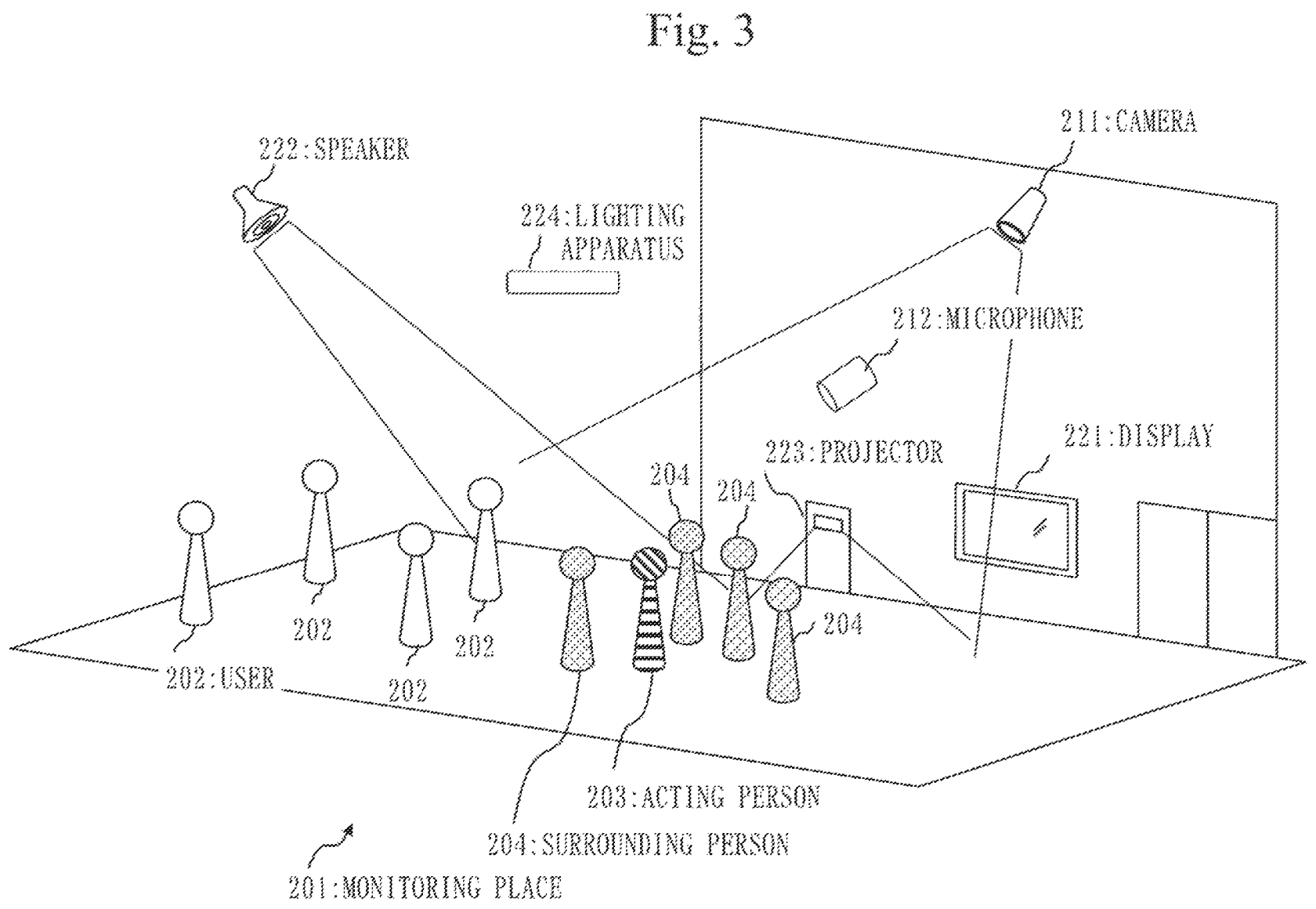

211:CAMERA

212:MICROPHONE

221:DISPLAY

223:PROJECTOR

224:LIGHTING APPARATUS

222:SPEAKER

204

203:ACTING PERSON

204:SURROUNDING PERSON

201:MONITORING PLACE

202

202:USER

Fig. 6

191:CHARACTERISTIC DATA GROUP

| TYPE | CHARACTERISTIC INFORMATION |
|---|---|
| VIOLATING ACTION A | CHARACTERISTIC INFORMATION A |
| VIOLATING ACTION B | CHARACTERISTIC INFORMATION B |
| VIOLATING ACTION C | CHARACTERISTIC INFORMATION C |
| . . . | . . |

Fig. 7

192:VIOLATING-ACTION POSSIBILITY DATA

| RANGE OF COINCIDENCE DEGREE IN RESPECT OF VIOLATING ACTION A | VIOLATING-ACTION POSSIBILITY |
|---|---|
| 70% OR MORE | HIGH |
| 30% TO LESS THAN 70% | LIKELY |
| LESS THAN 30% | LOW |

Fig. 9

193:SURROUNDING CONDITION DATA GROUP

| TYPE | SURROUNDING CONDITION |
|---|---|
| VIOLATING ACTION A | WITHIN A METERS |
| VIOLATING ACTION B | WITHIN B METERS |
| VIOLATING ACTION C | WITHIN C METERS |
| . . . | . . . |

Fig. 10

194A:FACIAL-EXPRESSION-ORIENTED NUISANCE DEGREE DATA

| TYPE OF FACIAL EXPRESSION | NUISANCE DEGREE JUDGED FROM FACIAL EXPRESSION |
|---|---|
| ANGER, HATRED, DISSATISFACTION | LARGE |
| OTHER EMOTIONS | SMALL |

Fig. 11

194B:ACTION-ORIENTED NUISANCE DEGREE DATA

| TYPE OF ACTION | NUISANCE DEGREE JUDGED FROM ACTION |
|---|---|
| MOVING APART FROM ACTING PERSON AVOIDING ACTING PERSON LOOKING AT ACTING PERSON | LARGE |
| OTHER ACTIONS | SMALL |

Fig. 12

194C:NOTICE-ORIENTED NUISANCE DEGREE DATA

| NUMBER OF NOTICES | NUISANCE DEGREE JUDGED FROM NOTICES |
|---|---|
| x OR MORE | LARGE |
| LESS THAN x | SMALL |

Fig. 13

194D:SYNTHETIC NUISANCE DEGREE DATA

| ITEM | NUISANCE DEGRE | | | | | | | |
|---|---|---|---|---|---|---|---|---|
| | LARGE | | | | SMALL | | | |
| FACIAL EXPRESSION | LARGE | LARGE | SMALL | SMALL | LARGE | LARGE | SMALL | SMALL |
| ACTION | LARGE | SMALL | LARGE | SMALL | LARGE | SMALL | LARGE | SMALL |
| NOTICE | LARGE | LARGE | LARGE | LARGE | SMALL | SMALL | SMALL | SMALL |

Fig. 15

195:FINAL-DECISION POSSIBILITY DATA

| VIOLATING-ACTION POSSIBILITY | NUISANCE DEGREE "LARGE" | NUISANCE DEGREE "SMALL" |
|---|---|---|
| HIGH | "HIGH" | "HIGH" |
| LIKELY | "HIGH" | "LIKELY" |
| LOW | "LOW" | "LOW" |

Fig. 16

196:ALERT LEVEL DATA

| FINAL-DECISION POSSIBILITY | ANY SURROUNDING PERSON | ALERT LEVEL |
|---|---|---|
| HIGH | NO | DIRECT ADVICE (L 4) |
| | YES | INDIRECT ADVICE (L 3) |
| LIKELY | — | ALERT (L 2) |
| LOW | — | GENERAL ENLIGHTENMENT (L 1) |

Fig. 18

197:ALERT INFORMATION DATA

| ACTION TYPE | APPARATUS TYPE | | |
|---|---|---|---|
| | DISPLAY | PROJECTOR | SPEAKER |
| NONE | INFORMATION D FOR L1 | INFORMATION P FOR L1 | INFORMATION S FOR L1 |
| ACTION A | INFORMATION D FOR L2 | INFORMATION P FOR L2 | INFORMATION S FOR L2 |
| | INFORMATION D FOR L3 | INFORMATION P FOR L3 | INFORMATION S FOR L3 |
| | INFORMATION D FOR L4 | INFORMATION P FOR L4 | INFORMATION S FOR L4 |
| ACTION B | INFORMATION D FOR L2 | INFORMATION P FOR L2 | INFORMATION S FOR L2 |
| | INFORMATION D FOR L3 | INFORMATION P FOR L3 | INFORMATION S FOR L3 |
| | INFORMATION D FOR L4 | INFORMATION P FOR L4 | INFORMATION S FOR L4 |
| ACTION C | INFORMATION D FOR L2 | INFORMATION P FOR L2 | INFORMATION S FOR L2 |
| | INFORMATION D FOR L3 | INFORMATION P FOR L3 | INFORMATION S FOR L3 |
| | INFORMATION D FOR L4 | INFORMATION P FOR L4 | INFORMATION S FOR L4 |

Fig. 20

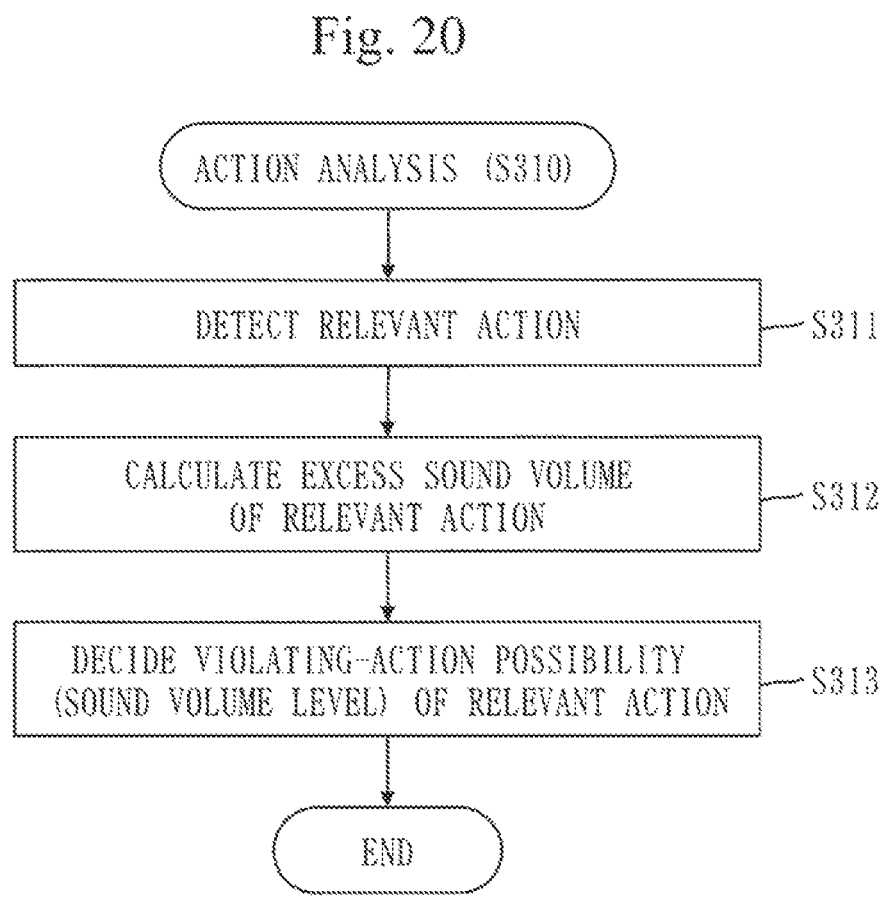

ACTION ANALYSIS (S310)

DETECT RELEVANT ACTION — S311

CALCULATE EXCESS SOUND VOLUME
OF RELEVANT ACTION — S312

DECIDE VIOLATING-ACTION POSSIBILITY
(SOUND VOLUME LEVEL) OF RELEVANT ACTION — S313

END

Fig. 22

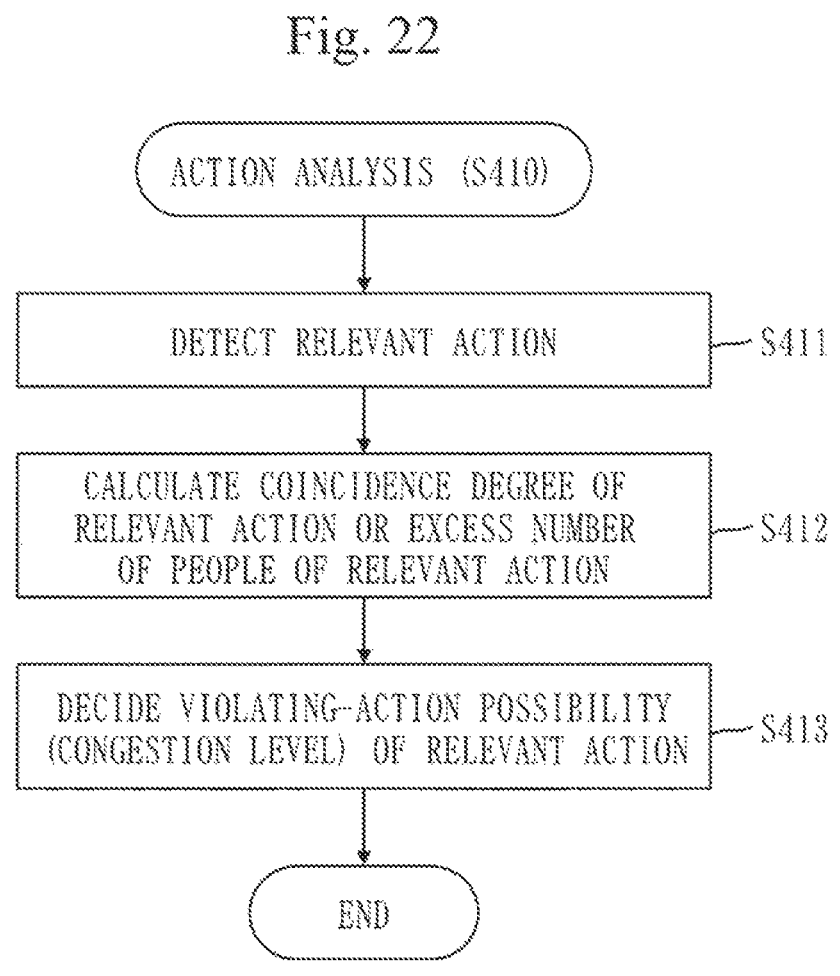

```
        ┌──────────────────────────────┐
        │   ACTION ANALYSIS  (S410)     │
        └──────────────────────────────┘
                      │
                      ▼
   ┌──────────────────────────────────────┐
   │      DETECT RELEVANT ACTION           │────S411
   └──────────────────────────────────────┘
                      │
                      ▼
   ┌──────────────────────────────────────┐
   │   CALCULATE COINCIDENCE DEGREE OF     │
   │   RELEVANT ACTION OR EXCESS NUMBER    │────S412
   │   OF PEOPLE OF RELEVANT ACTION        │
   └──────────────────────────────────────┘
                      │
                      ▼
   ┌──────────────────────────────────────┐
   │  DECIDE VIOLATING-ACTION POSSIBILITY  │
   │  (CONGESTION LEVEL) OF RELEVANT ACTION │────S413
   └──────────────────────────────────────┘
                      │
                      ▼
              ┌──────────────┐
              │     END      │
              └──────────────┘
```

Fig. 26

198A:ALERT LEVEL DATA

| NUMBER n OF PRESENTATION TIMES | ALERT LEVEL |
|---|---|
| 1 | L1 |
| 2 OR MORE | L2 |

Fig. 27

198B:ALERT LEVEL DATA

| NUMBER n OF PRESENTATION TIMES | ALERT LEVEL |
|---|---|
| 1 | L1 |
| 2 | L2 |
| 3 OR MORE | L3 |

Fig. 28

198C:ALERT LEVEL DATA

| NUMBER n OF PRESENTATION TIMES | ALERT LEVEL |
|:---:|:---:|
| 1 | L1 |
| 2 | L2 |
| 3 | L3 |
| 4 OR MOREE | L4 |

NUISANCE DEGREE-DECISION SYSTEM, INFORMATION PRESENTATION SYSTEM, INFORMATION PRESENTATION METHOD, AND COMPUTER READABLE MEDIUM

CROSS REFERENCE TO RELATED APPLICATION

This application is a Continuation of PCT International Application No. PCT/JP2020/039981, filed on Oct. 23, 2020, which is hereby expressly incorporated by reference into the present application.

TECHNICAL FIELD

The present disclosure relates to information presentation to suppress a nuisance behavior.

BACKGROUND ART

A nuisance behavior such as a manner violation in public places makes other people feel unpleasant. Also, when a manner violation is pointed out by others, it makes the violator feel unpleasant, and a trouble may occur.

Patent Literature 1 discloses a technique of detecting a nuisance behavior conducted by a passenger in a passenger cabin and requesting that passenger who performs the nuisance behavior to stop the nuisance behavior.

Specifically, according to the technique of Patent Literature 1, an individual presentation device is associated with each passenger in the passenger cabin. The individual presentation device is a facility provided to a mobile terminal or a seat, and can give a personal notice to each passenger in the passenger cabin individually. Then, according to the technique of Patent Document 1, a nuisance person in the passenger cabin is identified by a means such as detection from an image of the passenger cabin or a report from other passengers. Then, the individual presentation device associated with the nuisance person notifies the nuisance person of a request to stop the nuisance behavior.

CITATION LIST

Patent Literature

Patent Literature 1: JP 2020-3935 A

SUMMARY OF INVENTION

Technical Problem

The technique of Patent Literature 1 is premised on a fact that it is possible to identify individual passengers in a narrow, closed space. Furthermore, this technique is also premised on an existence of an individual presentation device capable of giving a notice to each passenger individually.

Accordingly, the technique of Patent Document 1 cannot be utilized in a public space used by a large number of unspecified people.

In addition, if a strong alert is given to a violating person in a situation where there is someone around the violating person, the violating person may feel unpleasant, and a trouble may occur.

An objective of the present disclosure is to make it possible to give an alert about a nuisance behavior in a public space while avoiding causing a trouble.

Solution to Problem

An information presentation system according to the present disclosure includes:

an action detection unit to analyze monitor data obtained by monitoring a monitoring place, and to detect a relevant action performed at the monitoring place and having a characteristic that is common to a violating action;

a situation detection unit to analyze visual data obtained by photographing the monitoring place, and to detect a surrounding situation of an action position equivalent to a position where the relevant action was performed;

a nuisance degree decision unit to decide a nuisance degree of the relevant action on a basis of the surrounding situation;

a level determination unit to determine an alert level on a basis of the nuisance degree; and an information presentation unit to present presentation information corresponding to the alert level with using a presentation apparatus installed at the monitoring place.

Advantageous Effects of Invention

According to the present disclosure, it is possible to give an alert about a nuisance behavior with a level according to a surrounding situation. This makes it possible to give an alert about a nuisance behavior in a public space while avoiding causing a trouble.

BRIEF DESCRIPTION OF DRAWINGS

FIG. 2 is a function configuration diagram of an information presentation device 100 in Embodiment 1.

FIG. 3 is a configuration diagram of a monitoring place 201 in Embodiment 1.

FIG. 6 is a diagram illustrating a characteristic data group 191 in Embodiment 1.

FIG. 7 is a diagram illustrating violating-action possibility data 192 in Embodiment 1.

FIG. 9 is a diagram illustrating a surrounding condition data group 193 in Embodiment 1.

FIG. 10 is a diagram illustrating facial-expression-oriented nuisance degree data 194A in Embodiment 1.

FIG. 11 is a diagram illustrating action-oriented nuisance degree data 194B in Embodiment 1.

FIG. 12 is a diagram illustrating notice-oriented nuisance degree data 194C in Embodiment 1.

FIG. 13 is a diagram illustrating synthetic nuisance degree data 194D in Embodiment 1.

FIG. 15 is a diagram illustrating final-decision possibility data 195 in Embodiment 1.

FIG. 16 is a diagram illustrating alert level data 196 in Embodiment 1.

FIG. 18 is a diagram illustrating alert information data 197 in Embodiment 1.

FIG. 20 is a flowchart of action analysis (S310) in Embodiment 3.

FIG. 22 is a flowchart of action analysis (S410) in Embodiment 4.

FIG. 26 is a diagram illustrating alert level data 198A in Embodiment 5.

FIG. 27 is a diagram illustrating alert level data 198B in Embodiment 5.

FIG. 28 is a diagram illustrating alert level data 198C in Embodiment 5.

DESCRIPTION OF EMBODIMENTS

Figure 1:
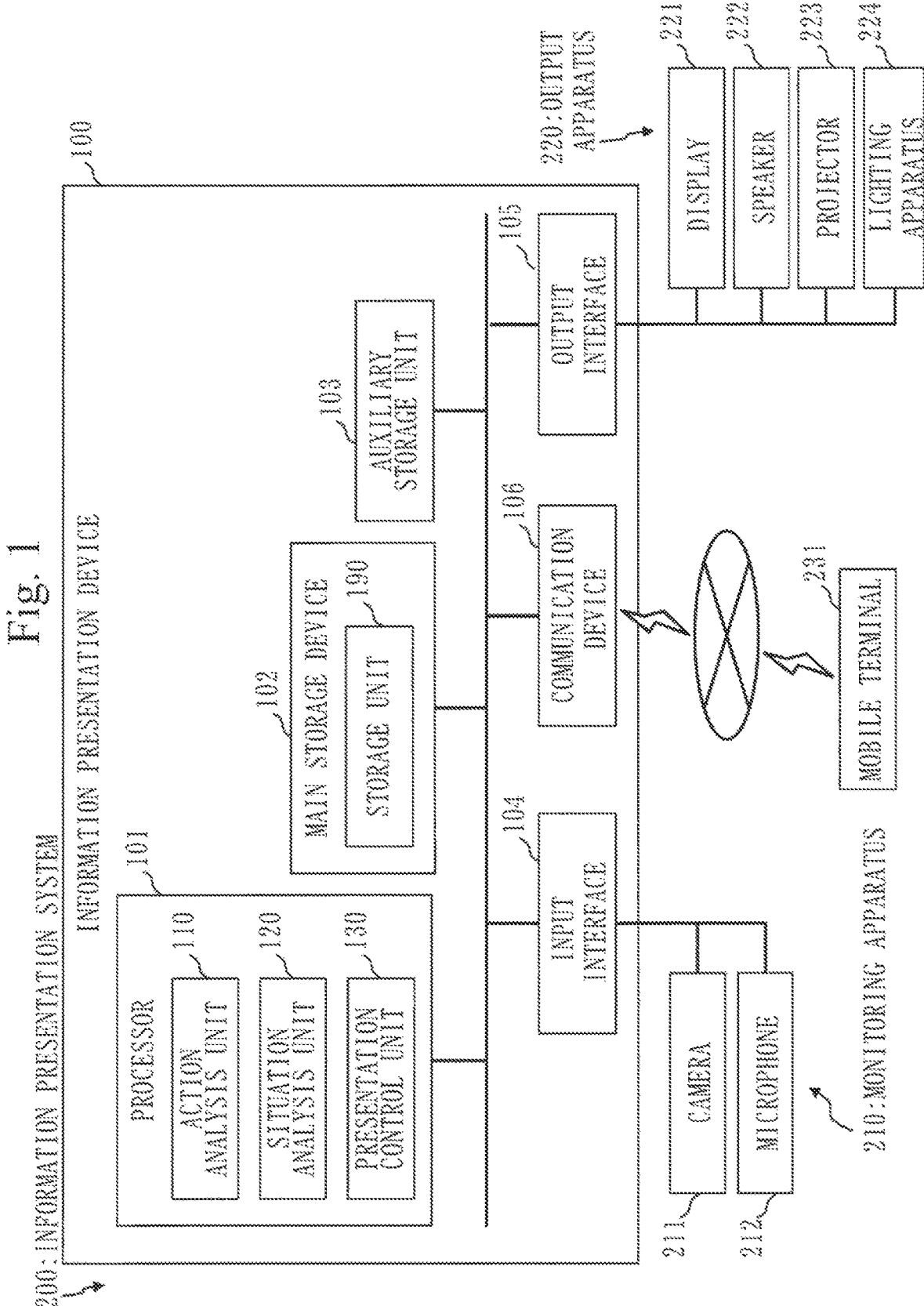
FIG. 1 is a configuration diagram of an information presentation system 200 in Embodiment 1.

In embodiments and drawings, the same elements or equivalent elements are denoted by the same reference sign. Description of an element denoted by the same reference sign as that of a described element will appropriately be omitted or simplified. Arrows in the drawings mainly illustrate data flows or process flows.

Embodiment 1

An information presentation system 200 will be described with referring to FIGS. 1 to 18.

*Description of Configuration*

A configuration of the information presentation system 200 will be described with referring to FIG. 1.

The information presentation system 200 is provided with an information presentation device 100.

The information presentation device 100 is a computer provided with hardware devices such as a processor 101, a main storage device 102, an auxiliary storage device 103, an input interface 104, an output interface 105, and a communication device 106. These hardware devices communicate with each other via a signal line.

The processor 101 is an IC to perform computation processing and controls the other hardware devices. For example, the processor 101 is a CPU, a DSP, or a GPU.

Note that IC stands for Integrated Circuit.

Note that CPU stands for Central Processing Unit.

Note that DSP stands for Digital Signal Processor.

Note that GPU stands for Graphics Processing Unit.

The main storage device 102 is a volatile or nonvolatile storage device. The main storage device 102 is also called a memory or a main memory. For example, the main storage device 102 is a RAM. Data stored in the main storage device 102 is saved in the auxiliary storage device 103 as necessary.

Note that RAM stands for Random-Access Memory.

The auxiliary storage device 103 is a nonvolatile storage device. For example, the auxiliary storage device 103 is a ROM, an HDD, or a flash memory. Data stored in the auxiliary storage device 103 is loaded to the main storage device 102 as necessary.

Note that ROM stands for Read-Only Memory.

Note that HDD stands for Hard Disk Drive.

The input interface 104 is a port to which an input device and a monitoring apparatus 210 are to be connected. For example, the input device includes a keyboard and a mouse for operating the information presentation device 100. For example, the monitoring apparatus 210 includes a camera 211 and a microphone 212. Inputting to the information presentation device 100 is performed by using the input interface 104.

The output interface 105 is a port to which an output device and an output apparatus 220 are to be connected. For example, the output device is a display for an operator who operates the information presentation device 100. For example, the output apparatus 220 includes a display 221, a speaker 222, a projector 223, and an lighting apparatus 224. Outputting from the information presentation device 100 is performed by using the output interface 105.

The communication device 106 is a receiver/transmitter. For example, the communication device 106 is a communication chip or an NIC. The information presentation device 100 communicates by using the communication device 106. For example, the information presentation device 100 communicates with a mobile terminal 231 by using the communication device 106.

Note that NIC stands for Network Interface Card.

The information presentation device 100 is provided with elements such as an action analysis unit 110, a situation analysis unit 120, and a presentation control unit 130. These elements are implemented by software.

An information presentation program to cause the computer to function as the action analysis unit 110, the situation analysis unit 120, and the presentation control unit 130 is stored in the auxiliary storage device 103. The information presentation program is loaded to the main storage device 102 and run by the processor 101.

An OS is also stored in the auxiliary storage device 103. At least part of the OS is loaded to the main storage device 102 and run by the processor 101.

The processor 101 runs the information presentation program while running the OS.

Note that OS stands for Operating System.

Input/output data of the information presentation program is stored in a storage unit 190.

The main storage device 102 functions as the storage unit 190. Alternatively, a storage device such as the auxiliary storage device 103, a register in the processor 101, and a cache memory in the processor 101 may function as the storage unit 190 in place of the main storage device 102 or together with the main storage device 102.

The information presentation device 100 may be provided with a plurality of processors that substitute for the processor 101.

The information presentation program can be computer-readably recorded (stored) in a nonvolatile recording medium such as an optical disk and a flash memory.

A functional configuration of the information presentation device 100 will be described with referring to FIG. 2.

The action analysis unit 110 is provided with an action detection unit 111 and an action decision unit 112.

Monitor data is inputted to the action analysis unit 110.

The monitor data is data obtained by the monitoring apparatus 210.

Monitor data obtained by the camera 211 will be called "visual data".

Monitor data obtained by the microphone 212 will be called "sound data".

The situation analysis unit 120 is provided with a situation detection unit 121, a notice acceptance unit 122, and a nuisance degree decision unit 123.

Notice data is inputted to the situation analysis unit 120.

The notice data is data that indicates information notified by the mobile terminal 231.

The presentation control unit 130 is provided with a level determination unit 131, an information selection unit 132, an apparatus selection unit 133, and an information presentation unit 134.

The presentation control unit 130 outputs presentation data.

The presentation data is data that indicates information presented with using the output apparatus 220.

A configuration of a monitoring place 201 will be described with referring to FIG. 3.

The monitoring place 201 is a place monitored by the monitoring apparatus 210. In particular, the monitoring place 201 is a place that is utilized by a large number of unspecified people. For example, the monitoring place 201 is a public place (space).

A person existing at the monitoring place 201, that is, a person who utilizes the monitoring place 201, will be referred to as a "user 202".

At the monitoring place 201, a nuisance behavior, a manner-violating behavior, and other actions which are prohibited at the monitoring place 201 will be referred to as a "violating action".

An action having a characteristic that is common to the violating action, that is, an action that may disturb others, will be referred to as a "relevant action".

A position corresponding to a place where a relevant action was performed will be referred to as an "action position".

The user 202 who performed the relevant action will be referred to as an "acting person 203".

A user 202 existing around the acting person 203 will be referred to as a "surrounding person 204".

The monitoring apparatus 210 such as the camera 211 and the microphone 212 is set at the monitoring place 201.

The monitoring apparatus 210 is an apparatus to monitor the monitoring place 201.

The camera 211 photographs the monitoring place 201 and outputs visual data.

The microphone 212 picks up sounds at the monitoring place 201 and outputs sound data.

At the monitoring place 201, a plurality of cameras 211 may be installed at different positions. Also, a plurality of microphones 212 may be installed at different positions. One or more monitoring apparatuses 210 that are different from the camera 211 or the microphone 212 may be installed.

Position information of each monitoring apparatus 210, and so on are stored in the storage unit 190 in advance.

Various types of output apparatuses 220 such as the display 221, the speaker 222, the projector 223, and the lighting apparatus 224 are installed at the monitoring place 201.

The output apparatus 220 is an apparatus to present to the acting person 203 alert information for preventing the relevant action.

At the monitoring place 201, a plurality of output apparatuses 220 of an individual type may be installed at different positions. Also, an output apparatus 220 of an individual type and one or more output apparatuses 220 of a different type may be installed.

The position information of each output apparatus 220, and so on are stored in the storage unit 190 in advance.

\*\*\*Description of Operations\*\*\*

A procedure of operations of the information presentation system 200 corresponds to an information presentation method. A procedure of operations of the information presentation device 100 corresponds to a procedure of processes performed by the information presentation program.

Figure 4:
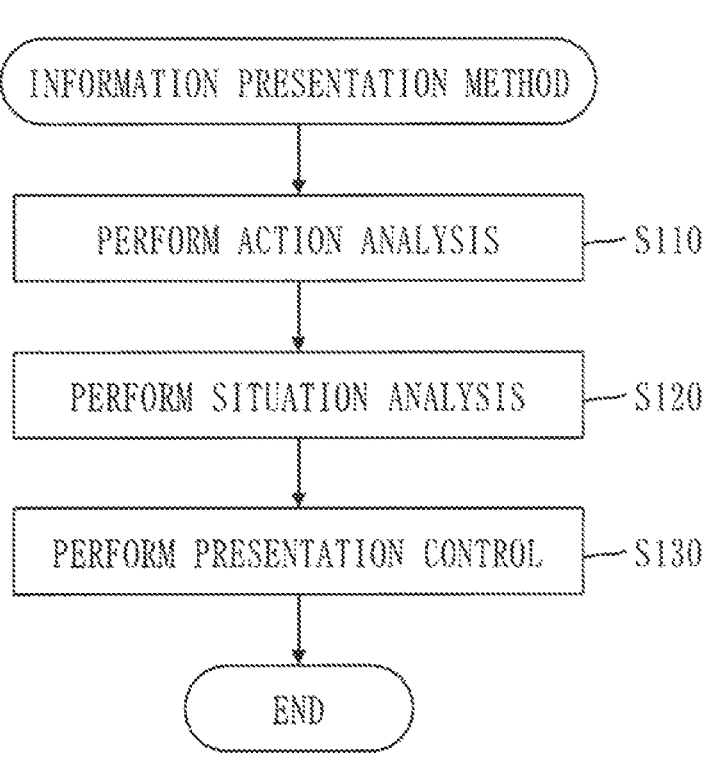
FIG. 4 is a flowchart of an information presentation method in Embodiment 1.

The information presentation method will be described with referring to FIG. 4.

In step S110, the action analysis unit 110 performs action analysis.

In the action analysis, the action detection unit 111 analyzes monitor data obtained by monitoring the monitoring place 201, and detects a relevant action.

The relevant action is an action performed at the monitoring place 201 and having a characteristic that is common to a violating action.

Step S110 will be described later in detail.

In step S120, the situation analysis unit 120 performs situation analysis.

In the situation analysis, the situation detection unit 121 analyzes visual data obtained by photographing the monitoring place 201, and detects a surrounding situation of the action position.

Then, the nuisance degree decision unit 123 decides a nuisance degree of the relevant action on a basis of the surrounding situation.

Step S120 will be described later in detail.

In step S130, the presentation control unit 130 performs presentation control.

In the presentation control, the level determination unit 131 determines an alert level on a basis of the nuisance degree.

Then, the information presentation unit 134 presents presentation information corresponding to the alert level with using a presentation apparatus installed at the monitoring place 201.

The presentation apparatus is the output apparatus 220 selected for presenting information.

Step S130 will be described later in detail.

Figure 5:
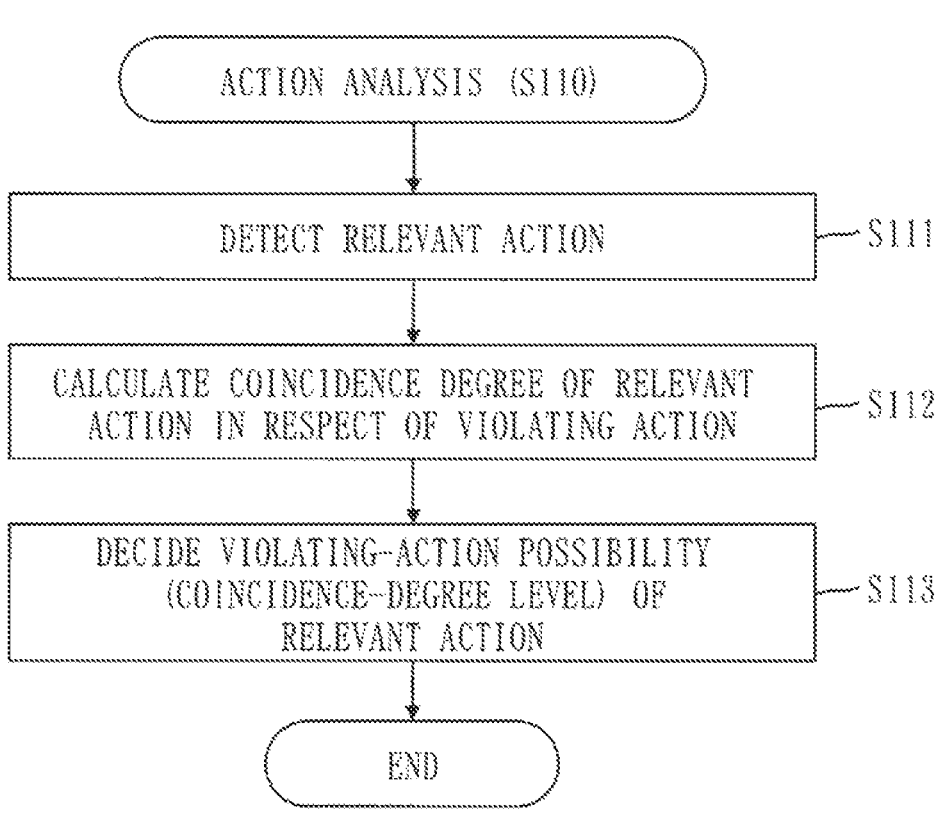
FIG. 5 is a flowchart of action analysis (S110) in Embodiment 1.

The action analysis (S110) will be described in detail with referring to FIG. 5.

In step S111, the action detection unit 111 analyzes the monitor data obtained by monitoring the monitoring place 201 and detects the relevant action.

Step S111 will be described in detail.

First, the action detection unit 111 accepts visual data.

Then, the action detection unit 111 analyzes the visual data so as to detect the relevant action, identify the acting person 203, and calculate a position of the acting person 203.

The position of the acting person 203 is the action position.

Note that a plurality of types of violating actions are defined in advance. The action detection unit 111 performs detection of the relevant action in respect of the plurality of types of violating actions.

Step S111 will be described specifically. The action detection unit 111 analyzes the visual data sequentially and performs processes (1) to (5).

(1) The action detection unit 111 detects individual users 202 reflected in images presented by the visual data.

(2) The action detection unit 111 extracts characteristic information of the action of each user 202 from the visual data. The characteristic information indicates one or more characteristics that identify an action. For example, the characteristic information indicates a position of each joint, a change in position of each joint, and so on. The extracted characteristic information will be referred to as "extract information".

(3) The action detection unit 111 searches for characteristic information indicating a characteristic that is common to the extract information, from a characteristic data group 191 (see FIG. 6), in units of the detected users 202. The characteristic information as a target of search will be referred to as "common information".

FIG. 6 illustrates the characteristic data group 191. The characteristic data group 191 is stored in the storage unit 190 in advance.

The characteristic data group 191 includes characteristic data of each of one or more types of violating actions.

The characteristic data associates the type of a violating action with characteristic information of the violating action.

(4) When common information is found, the user 202 of the common information is the acting person 203, and an action of that user 202 is the relevant action.

The action detection unit 111 extracts characteristic data that indicates the common information from the characteristic data group 191. The type indicated by the characteristic data to be extracted is a type of a violating action corresponding to the relevant action, and is equivalent to a type of the relevant action.

(5) The action detection unit 111 analyzes the visual data and calculates the position of the acting person 203.

For example, coordinate transformation data that associates three-dimensional coordinate values of each feature placed at the monitoring place 201 with two-dimensional coordinate values of each feature in an image is stored in the storage unit 190 in advance. Then, the action detection unit 111 calculates three-dimensional coordinate values of the acting person 203 on a basis of the visual data and a positional relationship, in the image, between the acting person 203 and each feature. For example, when the acting person 203 is located at a middle point between a first feature and a second feature, the action detection unit 111 calculates three-dimensional coordinate values of the middle point between the first feature and the second feature with using the three-dimensional coordinate values of the first feature and the three-dimensional coordinate values of the second feature. The three-dimensional coordinate values to be calculated are the three-dimensional coordinate values of the acting person 203. Each feature placed at the monitoring place 201 may be a monitoring apparatus 210 or an output apparatus 220, or may be any other object.

In step S112 (see FIG. 5), the action decision unit 112 calculates a coincidence degree of the relevant action in respect of the violating action on a basis of characteristic information of the relevant action and characteristic information of the violating action.

Step S112 will be described in detail.

The characteristic information of the relevant action is obtained by (2) of step S111.

The characteristic information of the violating action is obtained by (4) of step S111.

The action decision unit 112 calculates a proportion of characteristics that are common to the characteristic information of the violating action and the characteristic information of the relevant action. The proportion to be calculated is the coincidence degree of the relevant action in respect of the violating action.

For example, if a number of characteristics indicated in the characteristic information of the violating action is "10" and a number of characteristics that are common to the characteristic information of the violating action and the characteristic information of the relevant action is "7", the coincidence degree is "70%". Note that "%" signifies percentage.

In step S113, the action decision unit 112 decides a violating-action possibility of the relevant action on a basis of the coincidence degree of the relevant action in respect of the violating action.

The violating-action possibility is equivalent to a coincidence-degree level indicating how much the coincidence degree is, and indicates a possibility that the relevant action is a violating action.

Specifically, the action decision unit 112 selects a violating-action possibility corresponding to the coincidence degree from violating-action possibility data 192 (see FIG. 7) corresponding to the type of the relevant action. The violating-action possibility to be selected is the violating-action possibility of the relevant action.

FIG. 7 illustrates the violating-action possibility data 192 in respect of a violating action A. The violating-action possibility data 192 is stored in the storage unit 190 in advance according to the type of the relevant action.

The violating-action possibility data 192 associates a range of the coincidence degree with a violating-action possibility per range of the coincidence degree.

In FIG. 7, three different levels are defined for the coincidence degree. A coincidence degree of a first level is 70% or more, which is high. A coincidence degree of a second level is 30% or more to less than 70%, which is more or less medium. A coincidence degree of a third level is less than 30%, which is low.

If a level of a coincidence degree of a relevant action in respect of the violating action A is the first level, the violating-action possibility is "high".

If the level of the coincidence degree of the relevant action in respect of the violating action A is the second level, the violating-action possibility is "likely".

If the level of the coincidence degree of the relevant action in respect of the violating action A is the third level, the violating-action possibility is "low".

Figure 8:
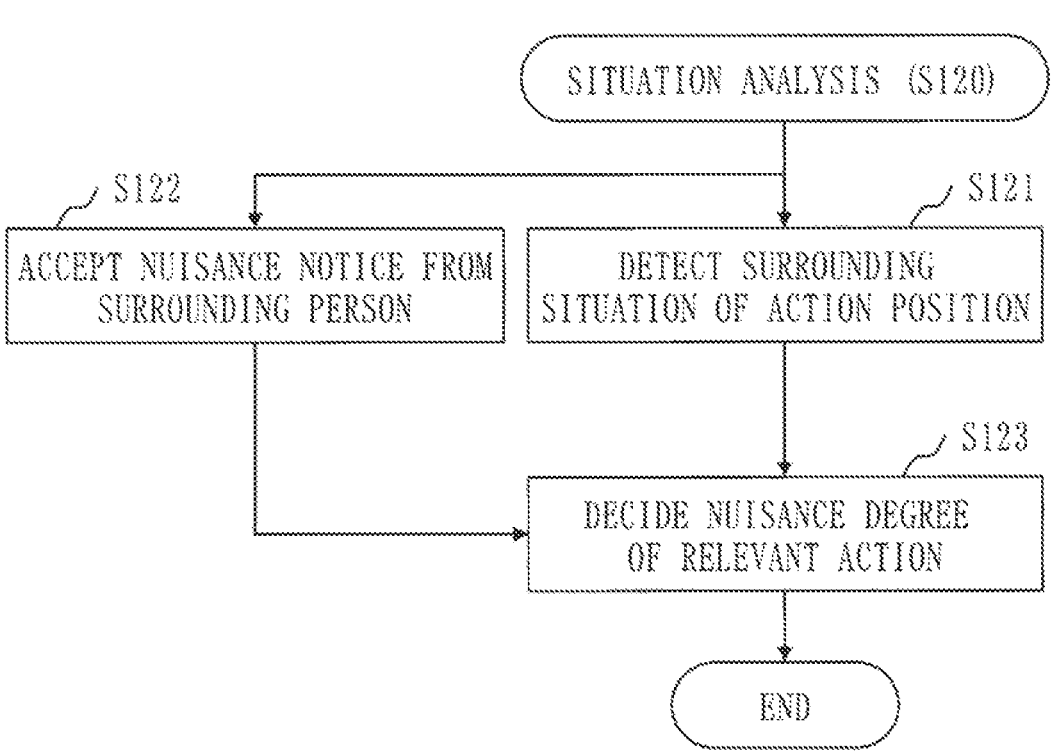
FIG. 8 is a flowchart of situation analysis (S120) in Embodiment 1.

The situation analysis (S120) will be described in detail with referring to FIG. 8.

In step S121, the situation detection unit 121 analyzes the visual data and detects the surrounding situation of the action position.

Step S121 will be described in detail.

The situation detection unit 121 detects, as one of pieces of information that indicate the surrounding situation, whether or not there is any surrounding person 204.

If a surrounding person 204 exists, the situation detection unit 121 detects, as one of pieces of information that indicates the surrounding situation, at least either one of a facial expression of the surrounding person 204 and an action of the surrounding person 204.

Step S121 will be described specifically. The action decision unit 112 analyzes the visual data sequentially and performs processes (1) to (6).

(1) The situation detection unit 121 analyzes the visual data and calculates positions of the individual users 202 (excluding the acting person 203). A method of calculation is the same as the method of (5) of step S111.

(2) The situation detection unit 121 extracts a surrounding condition for the type of the relevant action from a surrounding condition data group 193 (see FIG. 9). The type of the relevant action is the type of the violating action corresponding to the relevant action, and is identified by (4) of step S111.

FIG. 9 illustrates the surrounding condition data group 193. The surrounding condition data group 193 is stored in the storage unit 190 in advance.

The surrounding condition data group 193 includes surrounding condition data of each of one or more types of violating actions.

The surrounding condition data associates the type of the violating action with the surrounding condition of the violating action.

The surrounding condition is a condition of a range where the violating action causes a nuisance, that is, a range that can be regarded as a surrounding (vicinity) of the violating action, and is defined according to the type of the violating action. For example, the surrounding condition is defined by a distance from the action position as a base point. The position of the acting person 203 equivalent to the action position is calculated by (5) of step S111.

The surrounding condition of each violating action may be different from or the same as the surrounding condition of another violating action.

The range identified by each surrounding condition may have either one of a circular shape and a rectangular shape, or may have any other shape.

(3) The situation detection unit 121 identifies a user 202 existing at each position that satisfies the extracted surrounding condition. Each user 202 to be identified is a surrounding person 204.

If a user 202 does not exist at each position that satisfies the extracted surrounding condition, a surrounding person 204 does not exist.

If a user 202 exists at a position that satisfies the extracted surrounding condition, a surrounding person 204 exists.

(4) When a surrounding person 204 exists, the situation detection unit 121 analyzes visual data and detects a facial expression and an emotion of each surrounding person 204.

Specifically, the situation detection unit 121 recognizes a characteristic of an overall facial motion of the surrounding person 204, for example, having wide mouth corners or having sagging mouth corners. Then, the situation detection unit 121 decides emotion such as anger, hatred, and dissatisfaction on a basis of the recognized characteristic.

For example, various types machine learning schemes such as a learning model using training data are utilized to detect the facial expression and the emotion. Also, open-source software may be utilized.

(5) When a surrounding person 204 exists, the situation detection unit 121 analyzes the visual data and detects action of each surrounding person 204.

Specifically, the situation detection unit 121 detects an action such as moving apart from the acting person 203, avoiding the acting person 203, and looking at the acting person 203.

For example, various types of machine learning schemes such as a learning model using training data are utilized to detect the action. Also, open-source software may be utilized.

(6) When a surrounding person 204 exists, the situation detection unit 121 counts a number of surrounding persons 204.

In step S122 (see FIG. 8), when a surrounding person 204 exists, each surrounding person 204 transmits a nuisance notice with using the mobile terminal 231.

Then, during a predetermined period of time, the notice acceptance unit 122 accepts the nuisance notice transmitted from the mobile terminal 231 of each surrounding person 204.

The nuisance notice is a notice for reporting an action that caused a nuisance to the surrounding person 204, and indicates information such as notification time, a notification position, and an action type.

For example, the information presentation system 200 is provided with a web server. The web server manages a website for nuisance notification according to the monitoring place 201. The website for nuisance notification has a function (for example, a graphical user interface) for accepting information that someone is disturbed, information of a position where the nuisance was caused (for example, position information of the mobile terminal 231), and information such as a type of action that caused the nuisance. Also, the website for nuisance notification has a function of transmitting a nuisance notice indicating the accepted information, the notification time, and so on to the information presentation device 100.

Then, the surrounding person 204 transmits the nuisance notice by accessing the website for nuisance notification with using the mobile terminal 231.

In step S123, the nuisance degree decision unit 123 decides the nuisance degree of the relevant action on a basis of the surrounding situation of the action position and a number of nuisance notices.

Step S123 will be described specifically. The nuisance degree decision unit 123 performs processes (1) to (4).

(1) The nuisance degree decision unit 123 selects a nuisance degrees judged from a facial expression of each individual surrounding person 204, out of facial-expression-oriented nuisance degree data 194A (see FIG. 10), and decides a nuisance degree judged from the facial expression, on a basis of the selected nuisance degree. For example, the nuisance degree decision unit 123 decides a highest nuisance degree among the selected nuisance degrees, as the nuisance degree judged from the facial expression.

FIG. 10 illustrates the facial-expression-oriented nuisance degree data 194A. The facial-expression-oriented nuisance degree data 194A is stored in the storage unit 190 in advance.

The facial-expression-oriented nuisance degree data 194A associates the type of facial expression with a nuisance degree judged from the facial expression, per type of the facial expression.

For example, a nuisance degree judged from a facial expression expressing anger, a facial expression expressing hatred, or a facial expression expressing dissatisfaction is "large". Nuisance degrees judged from facial expressions reflecting other emotions are "small".

The facial-expression-oriented nuisance degree data 194A may be prepared according to the monitoring place 201. Types of facial expressions and a relationship between the types and the nuisance degrees may be defined appropriately on a basis of a condition of the monitoring place 201, such as a size of the monitoring place 201 and a number of users of the monitoring place 201.

(2) The nuisance degree decision unit 123 selects a nuisance degree judged from an action of each individual surrounding persons 204, out of action-oriented nuisance degree data 194B (see FIG. 11), and decides a nuisance degree judged from the action, on a basis of the selected nuisance degree. For example, the nuisance degree decision unit 123 decides a highest nuisance degree among the selected nuisance degrees, as the nuisance degree judged from the action.

FIG. 11 illustrates the action-oriented nuisance degree data 194B. The action-oriented nuisance degree data 194B is stored in the storage unit 190 in advance.

The action-oriented nuisance degree data 194B associates the type of action with a nuisance degree judged from the action, per type of the action.

For example, a nuisance degree judged from an action such as moving apart from the acting person 203, avoiding the acting person 203, and looking at the acting person 203, is "large". Nuisance degrees judged from the other actions are "small".

The action-oriented nuisance degree data 194B may be prepared according to the monitoring place 201. Types of actions and a relationship between the types and the nuisance degrees may be defined appropriately on a basis of a condition of the monitoring place 201, such as a size of the monitoring place 201 and a number of users of the monitoring place 201.

(3) First, the nuisance degree decision unit 123 decides a nuisance notice for the relevant action among accepted nuisance notices.

Specifically, the nuisance degree decision unit 123 identifies the nuisance notice for the relevant action by collating a notification time, a notification position, and an action type which are indicated by each nuisance notice with a detection time, an action position, and an action type of the relevant action.

Next, the nuisance degree decision unit 123 counts a number of nuisance notices against the relevant action.

Then, the nuisance degree decision unit 123 selects a nuisance degree corresponding to the number of nuisance notices against the relevant action, out of notice-oriented nuisance degree data 194C (see FIG. 12). The nuisance degree to be selected is the nuisance degree based on the notice.

FIG. 12 illustrates the notice-oriented nuisance degree data 194C. The notice-oriented nuisance degree data 194C is stored in the storage unit 190 in advance.

The notice-oriented nuisance degree data 194C associates the number of notices with nuisance degrees judged from the notices, per number of notices.

For example, when the number of notices is "x" or more, the nuisance degree judged from the notices is "large". When the number of notices is less than "x", the nuisance degree judged from the notices is "small".

The notice-oriented nuisance degree data 194C may be prepared according to the monitoring place 201. The threshold value "x" of the number of notices may be defined appropriately on a basis of the condition of the monitoring place 201, such as a size of the monitoring place 201 and a number of users of the monitoring place 201. For example, a threshold value "1" is defined for a monitoring place 201 that can only accommodate a few people. In this case, when there is one nuisance notice, if any, the nuisance degree becomes "large".

(4) The nuisance degree decision unit 123 selects a synthetic nuisance degree corresponding to the nuisance degree judged from facial expression, the nuisance degree judged from action, and the nuisance degree judged from notice, out of synthetic nuisance degree data 194D (see FIG. 13). The synthetic nuisance degree to be selected is regarded as the nuisance degree of the relevant action.

FIG. 13 illustrates the synthetic nuisance degree data 194D. The synthetic nuisance degree data 194D is stored in the storage unit 190 in advance.

The synthetic nuisance degree data 194D indicates the synthetic nuisance degree for each combination of the nuisance degree judged from the facial expression, the nuisance degree judged from the action, and the nuisance degree judged from the notice.

The nuisance degree decision unit 123 may decide, as the nuisance degree of the relevant action, one of the nuisance degree judged from the facial expression, the nuisance degree judged from the action, and the nuisance degree judged from the notice.

Alternatively, the nuisance degree decision unit 123 may decide, as the nuisance degree of the relevant action, a synthetic nuisance degree based on a combination of any two nuisance degrees among the nuisance degree judged from the facial expression, the nuisance degree judged from the action, and the nuisance degree judged from the notice.

The presentation control (S130) will be described in detail with referring to FIG. 14.

In step S131, the apparatus selection unit 133 selects an output apparatus 220 to be used as the presentation apparatus from among the plurality of types of output apparatuses 220 on a basis of at least one of the coincidence-degree level of the relevant action in respect of the violating action, the action position of the relevant action, and the surrounding situation of the relevant action. The apparatus selection unit 133 may select two or more presentation apparatuses.

Step S131 will be specifically described. The violating-action possibility is equivalent to the coincidence-degree level.

The apparatus selection unit 133 selects a presentation apparatus according to a selection rule. The selection rule for the presentation apparatus is defined in advance.

For example, if the violating-action possibility is "low", the apparatus selection unit 133 selects the speaker 222 as the presentation apparatus. Note that the apparatus selection unit 133 may select one or a combination of the display 221, the speaker 222, and the projector 223, as the presentation apparatus.

For example, if the violating-action possibility is "likely" or "high", the apparatus selection unit 133 selects the presentation apparatus on a basis of the action position and the surrounding situation. If the number of surrounding persons 204 is larger than a threshold value of the number of people, the apparatus selection unit 133 selects the speaker 222 as the presentation apparatus. The apparatus selection unit 133 selects the speaker 222 or projector 223 whichever is the nearest to the action position, as the presentation apparatus, regardless of the number of surrounding persons 204.

In step S132, the level determination unit 131 determines the alert level on a basis of the nuisance degree of the relevant action, the coincidence-degree level of the relevant action in respect of the violating action, and whether or not there is any surrounding person 204.

The alert level is a level of alert issuance to the acting person 203.

Step S132 will be described specifically. The level determination unit 131 performs processes (1) and (2). Note that the violating-action possibility based on the coincidence degree is equivalent to the coincidence-degree level.

(1) The level determination unit 131 decides a final-decision possibility on a basis of the nuisance degree of the relevant action and the violating-action possibility which is based on the coincidence degree.

The nuisance degree of the relevant action is obtained in step S123.

The violating-action possibility based on the coincidence degree is obtained in step S113.

The final-decision possibility is a violating-action possibility that is finally decided.

Specifically, the level determination unit 131 selects the final-decision possibility corresponding to the violating-action possibility based on the coincidence degree and to the nuisance degree of the relevant action, out of final-decision possibility data 195 (see FIG. 15).

FIG. 15 illustrates the final-decision possibility data 195. The final-decision possibility data 195 is stored in the storage unit 190 in advance.

The final-decision possibility data 195 indicates the final-decision possibility for each combination of the violating-action possibilities based on the coincidence degrees and the nuisance degrees of the relevant action.

For example, if the violating-action possibility based on the coincidence degree is "high" and the nuisance degree of the relevant action is "large", the final-decision possibility is decided as "high".

If the violating-action possibility based on the coincidence degree is "likely" and the nuisance degree of the relevant action is "small", the final-decision possibility is decided as "likely". In this case, the relevant action may grow into a violating action. An effect of preventing occurrence of the violating action by presenting alert information is expected.

(2) The level determination unit 131 determines the alert level on a basis of the final-decision possibility and whether or not there is any surrounding person 204.

Whether or not there is any surrounding person 204 is detected in step S121 as one of pieces of information that indicate the surrounding situation.

Specifically, the level determination unit 131 selects an alert level corresponding to the final-decision possibility and whether or not there is any surrounding person 204, out of alert level data 196 (see FIG. 16).

FIG. 16 illustrates the alert level data 196. The alert level data 196 is stored in the storage unit 190 in advance.

The alert level data 196 indicates the alert level for each combination of the final-decision possibility and whether or not there is any surrounding person 204.

For example, the alert levels are defined in four stages. The higher the level, the higher the degree of intensity of the alert (warning).

At alert level 1 (general enlightenment), general enlightenment is performed for announcing manners and rules that suit the occasion. No particular alert is given to acting person 203, and the acting person 203 will not feel particularly unpleasant. A specific example of presentation information (message) of alert level 1 is "Please refrain from action A, action B, and action C here."

At alert level 2 (alert), an alert is issued against a particular action. That is, the information presentation system 200 alerts the acting person 203. A specific example of presentation information (message) of alert level 2 is "Please refrain from action A as it will be a nuisance."

At alert level 3 (indirect advice), an alert more intense than alert level 2 is issued. For example, the information presentation system 200 alerts the acting person 203 and presents a fact that the action of the acting person 203 troubles someone. By doing so, the information presentation system 200 indirectly informs the acting person 203 that the action of the acting person 203 is unpreferable. A specific example of presentation information (message) of alert level 3 is "There is someone troubled by Action A." and "Please do not take action A as it will be a nuisance to other users."

At alert level 4 (direct advice), a much more intense alert is given. That is, the information presentation system 200 makes a strong warning that instructs the acting person 203 to stop the action. A specific example of presentation information (message) of alert level 4 is "Action A is prohibited here." and "Please refrain from action A."

For example, if the final-decision possibility is "high" and there is no surrounding person 204, the acting person 203 does not need to care about others even when an alert is given. Therefore, alert level 4 that is a direct alert level with a high alert degree is selected.

For example, if the final-decision possibility is "high" and there is a surrounding person 204, when a direct alert is given, the acting person 203 may care about others and will possibly be embarrassed. Therefore, level 3 for giving an alert to the acting person 203 indirectly is selected.

For example, if the final-decision possibility is "likely", alert level 2 is selected to make the acting person 203 aware that his or her action may trouble others.

For example, if the final-decision possibility is "low", alert level 1 that is an alert level for general enlightenment is selected.

Figure 17:
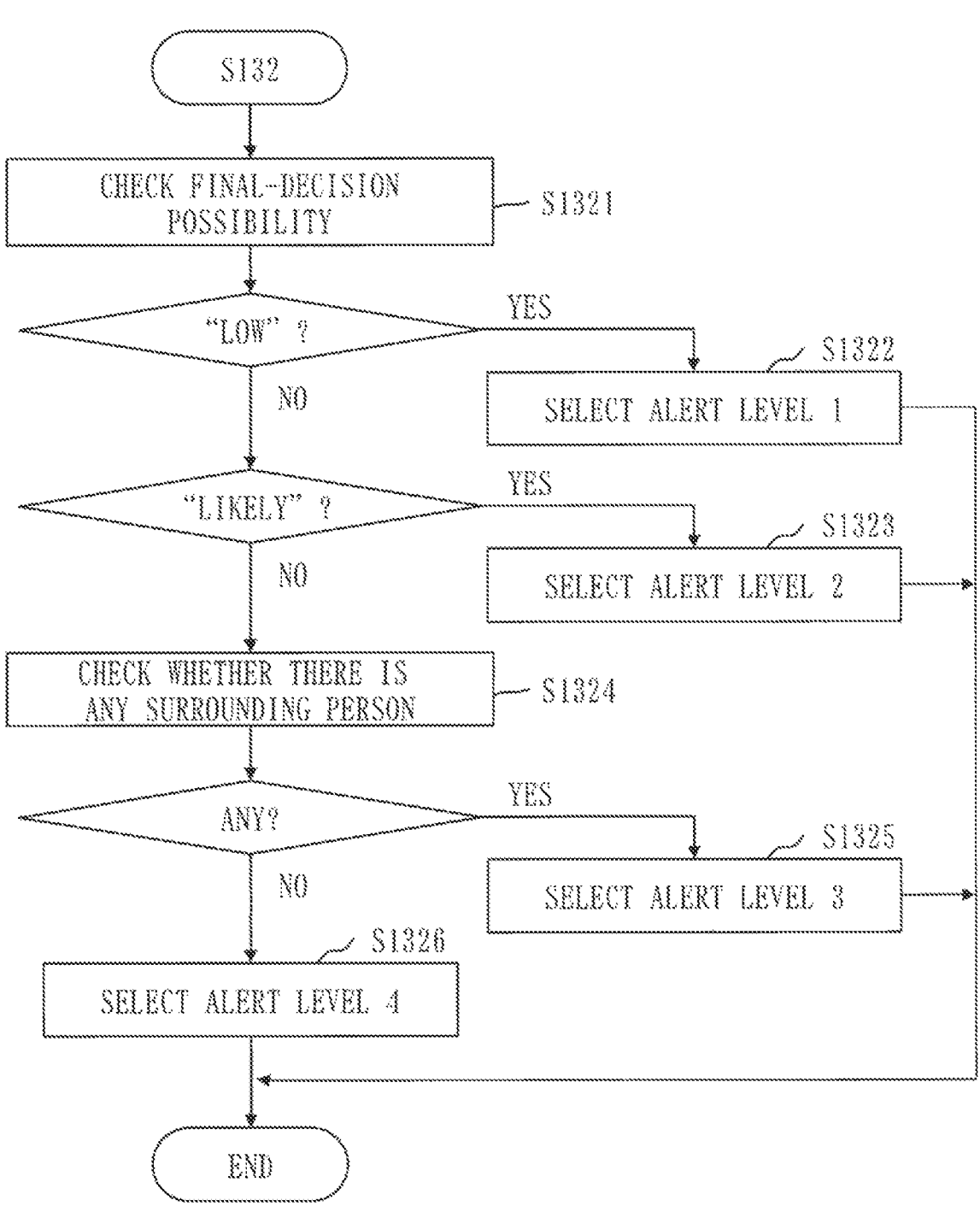
FIG. 17 is a flowchart of step S132 in Embodiment 1.

FIG. 17 illustrates a flowchart of step S132.

In step S1321, the level determination unit 131 checks the final-decision possibility.

If the final-decision possibility is "low", the processing proceeds to step S1322.

If the final-decision possibility is "likely", the processing proceeds to step S1323.

If the final-decision possibility is "high", the processing proceeds to step S1324

In step S1322, the level determination unit 131 selects alert level 1.

After step S1322, step S132 ends.

In step S1323, the level determination unit 131 selects alert level 2.

After step S1323, step S132 ends.

In step S1324, the level determination unit 131 checks whether or not there is any surrounding person 204.

If there is a surrounding person 204, the processing proceeds to step S1325.

If there is no surrounding person 204, the processing proceeds to step S1326.

In step S1325, the level determination unit 131 selects alert level 3.

After step S1325, step S132 ends.

In step S1326, the level determination unit 131 selects alert level 4.

After step S1326, step S132 ends.

The level determination unit 131 may determine the alert level on a basis of one or a combination of the nuisance degree of the relevant action, the coincidence-degree level of the relevant action in respect of the violating action, and whether or not there is any surrounding person 204.

Figure 14:
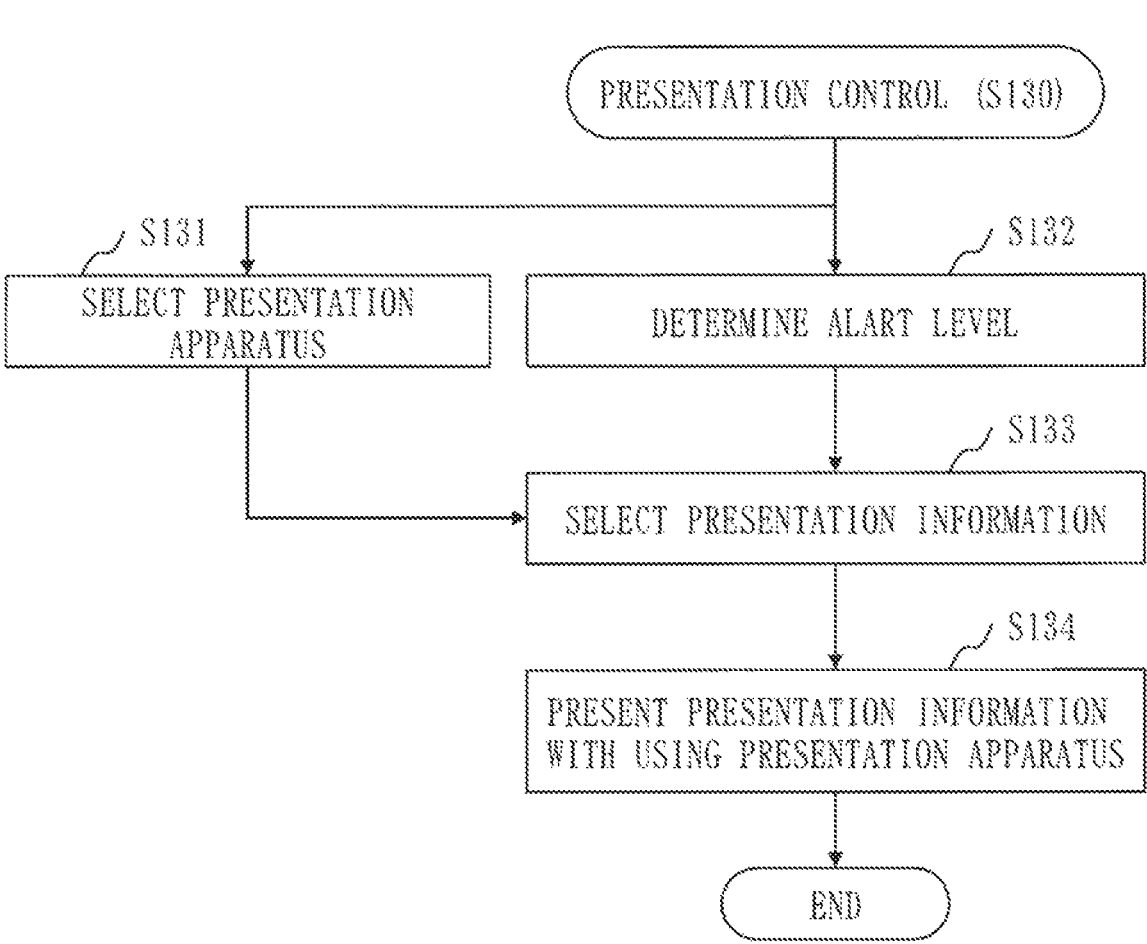
FIG. 14 is a flowchart of presentation control (S130) in Embodiment 1.

Back to FIG. 14, the description resumes with step S133.

In step S133, the information selection unit 132 selects alert information corresponding to the alert level out of a plurality of pieces of alert information. The alert information to be selected is the presentation information.

The alert information is information determined in advance as information to be presented to the acting person 203, and is stored in the storage unit 190 in advance as being associated with the alert level.

Step S133 will be described in detail.

The information selection unit 132 selects alert information corresponding to at least one of the alert level, a type of the relevant action, and a type of the presentation apparatus.

Step S133 will be described specifically.

The information selection unit 132 selects alert information corresponding to the alert level, the type of the presentation apparatus, and the type of the relevant action, out of alert information data 197 (see FIG. 18). The selected alert information is the presentation information.

FIG. 18 illustrates the alert information data 197. The alert information data 197 is stored in the storage unit 190 in advance.

The alert information data 197 indicates alert information for each combination of the alert level, the type of the presentation apparatus, and the type of the relevant action.

In FIG. 18, "information D" is alert information for the display 221, "information P" is alert information for the projector 223, and "information S" is alert information for the speaker 222.

Also, an action type "none" signifies a case where the final-decision possibility is "low". When the final-decision possibility is "low", the alert level is "1".

The alert information data 197 shows the information D, the information P, and the information S, for the action type "none". That is, the alert information data 197 shows three types of alert information directed to action type "none".

With respect to the action A, the alert information data 197 shows information D for alert level 2, information P for alert level 2, and information S for alert level 2. With respect to the action A, the alert information data 197 also shows information D for alert level 3, information P for alert level 3, and information S for alert level 3. Furthermore, with respect to the action A, the alert information data 197 shows information D for alert level 4, information P for alert level 4, and information S for alert level 4. That is, the alert information data 197 shows 9 types of alert information with respect to the action A.

Likewise, the alert information data 197 shows 9 types of alert information with respect to the action B and 9 types of alert information with respect to the action C.

Therefore, the alert information data 197 shows a total of 30 types of alert information.

Alert information of each alert level will be supplemented.

Alert information for alert level 1 (enlightenment information) has a content for announcing that actions such as "use of smartphone while walking", "running", and "smoking" are prohibited. That is, the alert information for alert level 1 has a content that does not particularly make a user feel unpleasant in a general public space when it is presented to the user.

The alert information for alert level 1 may have the same content regardless of the type of the relevant action.

Alert information for alert level 2 is selected when the final-decision possibility is "likely". When the final-decision possibility is "likely", it does not mean that the acting person 203 is certainly performing a violating action. Hence, if alert information with a strong content is presented to the acting person 203, it may make feel unpleasant the acting person 203 not performing a violating action. Therefore, the alert information of alert level 2 desirably has a content which, even if the alert information is presented to a large number of users 202 including the acting person 203, will not easily make each user 202 feel unpleasant.

For example, the alert information for level 2 has a content that specifies a type of a violating action corresponding to the relevant action and urges people not to perform a violating action of the specified type. By specifying the type of the violating action, an effect of making the acting person 203 aware that he or she is behaving against manners is expected. Also, an effect of letting the other users 202 accept the presented information as general enlightenment information similar to alert information for level 1 is expected.

Alert information for alert level 3 is selected when the final-decision possibility is "high" and there is a surrounding person 204. When alert information with a high alert degree that might request stopping a relevant action is presented to the acting person 203 directly, the surrounding person 204 is highly likely to also notice the alert information. Then, the acting person 203 is identified. The acting person 203 may be embarrassed and feel unpleasant. For this reason, the alert information for level 3 has a content that alerts the acting person 203 indirectly.

By indirectly informing that "a particular violating action has occurred" and that "the violating action troubles the other users 202", an effect is expected that the acting person 203 who realizes he or she may be performing the violating action will correct the action voluntarily.

Alert information for alert level 4 is selected when the final-decision possibility is "high" and there is no surrounding person 204. When there is no one around, if a direct alert is made to the acting person 203, the acting person 203 is unlikely to be embarrassed. Therefore, the alert information for level 4 is direct alert information requesting to stop the violating action.

The alert information may be defined appropriately such that the degree of alert intensifies stepwise according to the alert level. For example, the alert information of each alert level may be defined such that a tone of the message intensifies stepwise. The alert information may be defined such that when intensifying the degree of the alert, an alert sound is produced simultaneously with presentation of the message. Furthermore, the alert information may be defined to blink the lighting apparatus 224 or to change a lighting color of the lighting apparatus 224. Alert information in the presence of the surrounding person 204 may be defined to have an indirect alert content.

Note that the information selection unit 132 may select alert information corresponding to one or a combination of the alert level, the type of the presentation apparatus, and the type of the relevant action.

Back to FIG. 14, step S134 will be described.

In step S134, the information presentation unit 134 presents presentation information with using the presentation apparatus.

For example, the information presentation unit 134 transmits the presentation information to the presentation apparatus. The presentation apparatus receives the presentation information and outputs the received presentation information.

For example, the display 221 receives a text message or a message expressed by animation, as the presentation information, and displays the message to a screen.

For example, the speaker 222 receives an audio message as the presentation information and outputs the audio message. The speaker 222 may be a directional speaker. The speaker 222 may output the audio message toward the action position. In this case, the audio message is heard easily by the acting person 203 and is not easily heard by the other users 202.

For example, the projector 223 receives a text message or a message expressed by animation, as the presentation information, and displays the message onto a floor surface or the like.

For example, the lighting apparatus 224 receives presentation information that indicates a lighting pattern. The lighting apparatus 224 is turned on, blinks, or changes a lighting color according to the lighting pattern.

Effect of Embodiment 1

In a public space (monitoring place 201) which a large number of unspecified people utilize, the information presentation system 200 detects a violator (acting person 203) whose action violates manners, and alerts the violator. This can prevent a trouble from occurring between people when the violator is alerted by others.

The information presentation system 200 holds a plurality of pieces of alert information whose degrees of alert differ stepwise. Then, the information presentation system 200 changes alert information to be presented as necessary depending on a possibility of a violating action and a situation of people around the violator (whether or not there is anyone, the nuisance degree). Therefore, even in a public space which the large number of unspecified people utilize, the alerted violator will not feel unpleasant or be embarrassed. Furthermore, effective alert information that suits suited to the situation can be given.

Embodiment 2

A mode of a case where two or more relevant actions are detected will be described mainly regarding a difference from Embodiment 1.

*Description of Configuration*

A configuration of an information presentation system 200 is the same as the equivalent configuration in Embodiment 1 (see FIGS. 1 to 3).

*Description of Operations*

Action analysis (S110) will be described with referring to FIG. 5.

In step S111, an action detection unit 111 detects two or more relevant actions. The action detection unit 111 also identifies a type of each relevant action.

Furthermore, the action detection unit 111 identifies an acting person 203 of each relevant action and calculates a position of the acting person 203.

In step S112, for each relevant action, an action decision unit 112 calculates a coincidence degree of the relevant action in view of a violating action.

Then, the action decision unit 112 decides a relevant action having the highest coincidence degree, as a relevant action to take priority.

For example, if a coincidence degree of a relevant action by an acting person A is "70%" and a coincidence degree of a relevant action by an acting person B is "50%", the action decision unit 112 decides the relevant action by the acting person A as a relevant action to take priority.

When there are two or more relevant actions having the highest coincidence degree, the action decision unit 112 decides one of the two or more relevant actions having the highest coincidence degree as a relevant action to take priority, on a basis of individual types of the two or more relevant actions having the highest coincidence degree.

Specifically, a priority of each violating action is defined in advance in view of a plurality of types of violating actions. The action decision unit 112 decides a relevant action having the highest priority rank among the two or more relevant actions having the highest coincidence degree, as the relevant action to take priority.

For example, a listed order (action A, action B, action C) of violating actions indicated by alert information data 197 (FIG. 18) is the priority order of the violating actions.

Assume that the coincidence degree of the relevant action by the acting person A is the same as the coincidence degree of the relevant action by the acting person B. If the type of the relevant action by the acting person A is "action A" and the type of the relevant action by the acting person B is "action B", the action decision unit 112 decides the relevant action by the acting person A as the relevant action to take priority.

Following processes (step S113, step S120, and step S130) are executed for the relevant action to take priority.

In step S121 (see FIG. 8), when deciding whether or not there is any surrounding person 204 of the relevant action to take priority and a number of surrounding persons 204, a situation detection unit 121 may exclude an acting person 203 of another relevant action from the surrounding persons 204.

Effect of Embodiment 2

According to Embodiment 2, when two or more relevant actions are detected, a relevant action that should take priority can be identified, and an alert may be issued against it.

Embodiment 3

A mode of detecting a relevant action by using sound data will be described mainly regarding a difference from Embodiment 1.

A specific example of a violating action concerning sound is utterance at a place where silence is required (a library, a museum, or the like), or in a public closed space (in a train, a bus, an elevator, or the like).

*Description of Configuration*

A configuration of an information presentation system 200 is the same as the corresponding configuration in Embodiment 1 (see FIGS. 1 to 3).

*Description of Operations*

Figure 19:
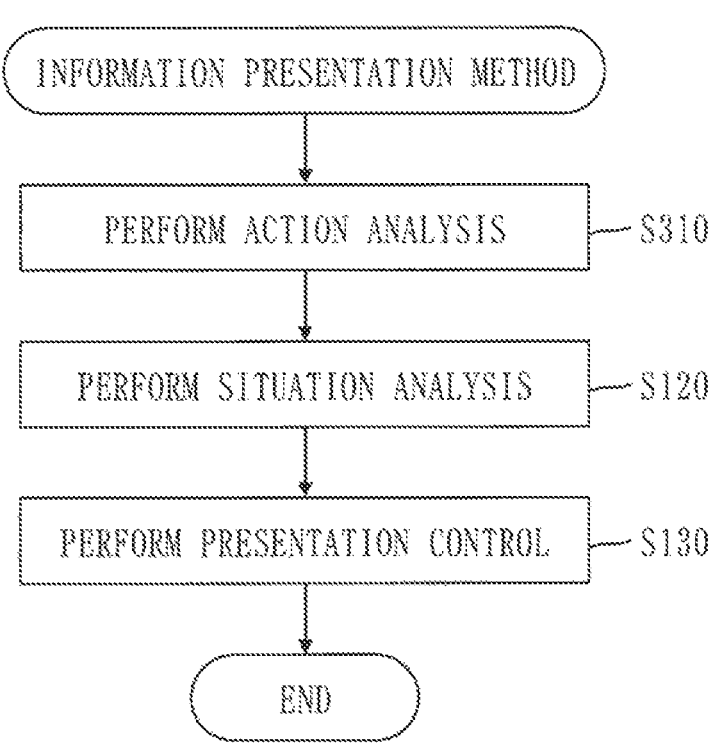
FIG. 19 is a flowchart of an information presentation method in Embodiment 3.

An information presentation method will be described with referring to FIG. 19.

In step S130, an action analysis unit 110 performs action analysis.

Step S310 corresponds to step S110 in Embodiment 1.

Step S310 will be described later in detail.

Step S120 and step S130 are the same as corresponding steps in Embodiment 1.

Action analysis (S310) will be described with referring to FIG. 20.

Step S311 through step S3 13 are equivalent to step S111 through step S113 in Embodiment 1.

In step S311, an action detection unit 111 analyzes sound data obtained by sound pickup at a monitoring place 201, and detects a relevant action.

A type of a violating action to be detected as the relevant action is "utterance that is noise".

Specifically, the action detection unit 111 analyzes sound data to detect a speaking voice, measures a sound volume of the detected speaking voice, and detects the relevant action on a basis of the measured sound volume.

A characteristic data group 191 (see FIG. 6) includes characteristic data of a violating action of a type "utterance that is noise". Characteristic information indicated by that characteristic data includes a sound volume threshold value.

If the measured sound volume is equal to or higher than the sound volume threshold value, the action detection unit 111 detects the utterance that produced the detected speaking voice as the relevant action.

The action detection unit 111 also acquires from a storage unit 190 position information of a microphone 212 that has obtained the sound data. The position information of the microphone 212 is stored in the storage unit 190 in advance.

A position of the microphone 212, that is, a sound pickup position is treated as an action position.

In step S312, an action decision unit 112 calculates a difference between the sound volume of the relevant action and the sound volume threshold value. The difference to be calculated will be referred to as an excess sound volume. The excess sound value is equivalent to a coincidence degree.

In step S313, the action decision unit 112 decides a violating-action possibility of the relevant action in respect of the violating action "utterance that is noise" on a basis of the excess sound volume.

The violating-action possibility of the relevant action is equivalent to a sound volume level of the relevant action. The sound volume level is equivalent to a coincidence degree level.

Situation analysis (S120) will be described with referring to FIG. 8.

In step S121, a situation detection unit 121 analyzes visual data and decides whether or not there is any surrounding person 204.

One of users 202 located around the sound pickup position is an acting person 203.

Among the user 202 located around the sound pickup position, users 202 other than the acting person 203 are the surrounding persons 204.

If there are two or more users 202 around the sound pickup position, a surrounding person 204 exists.

If there is only one user 202 around the sound pickup position, a surrounding person 204 does not exist.

Following processes (step S122, step S123, and step S130) are the same as corresponding steps in Embodiment 1.

Note that it is desirable if a selection rule is defined such that a display 221 or a projector 223 is selected as the presentation apparatus by priority over the other. Also, an lighting apparatus 224 near the action position may be selected together with the display 221 or the projector 223 as the presentation apparatus, and the lighting apparatus 224 may be turned on or blinked so that the acting person 203 will notice presentation information easily.

Effect of Embodiment 3

According to Embodiment 3, a relevant action can be detected with using sound data, and an alert can be issued.

Embodiment 4

A mode of detecting a violating action of a type "congestion of people" will be described mainly regarding a difference from Embodiment 1.

*Description of Configuration*

A configuration of an information presentation system 200 is the same as the corresponding configuration (see FIGS. 1 to 3) in Embodiment 1.

*Description of Operations*

An information presentation method will be described with referring to FIG. 21.

In step S410, an action analysis unit 110 performs action analysis.

Step S410 is equivalent to step S110 in Embodiment 1.

The action analysis (S410) will be described with referring to FIG. 22.

Step S411 through step S413 are equivalent to step S111 through step S113 in Embodiment 1.

In step S411, an action detection unit 111 analyzes visual data and detects a relevant action.

For example, the action detection unit 111 detects a relevant action of a type "congestion of people". In this case, it is not necessary to identify an acting person 203 and to calculate a position of the acting person 203.

The relevant action of the type "congestion of people" is detected as follows.

First, the action detection unit 111 detects individual users 202 reflected in visual data.

Next, the action detection unit 111 counts a number of users 202.

Then, the action detection unit 111 compares the number of users 202 with a threshold value of the number of people.

If the number of users 202 is equal to or larger than the threshold value of the number of people, a relevant action of the type "congestion of people" has occurred.

The threshold value of the number of people is included in characteristic information of characteristic data (see FIG. 6) for the violating action of the type "congestion of people". The "number of people" may be replaced by "density". The density is calculated with using the number of users 202 and an area of a monitoring place 201.

If the type of the relevant action is other than "congestion of people", step S412 and step S413 are the same as step S112 and step S113 in Embodiment 1.

A case where the type of the relevant action is "congestion of people" will be described.

In step S412, an action decision unit 112 calculates a difference between the number of users 202 and a threshold value of the number of people. The difference to be calculated will be referred to as an excess number of people. The excess number of people is equivalent to a coincidence degree.

In step S413, the action decision unit 112 decides a violating-action possibility of a relevant action in respect of a violating action being "congestion of people" on a basis of the excess number of people.

The violating-action possibility of the relevant action is equivalent to a congestion level of the relevant action. The congestion level is equivalent to the coincidence-degree level.

Figure 21:
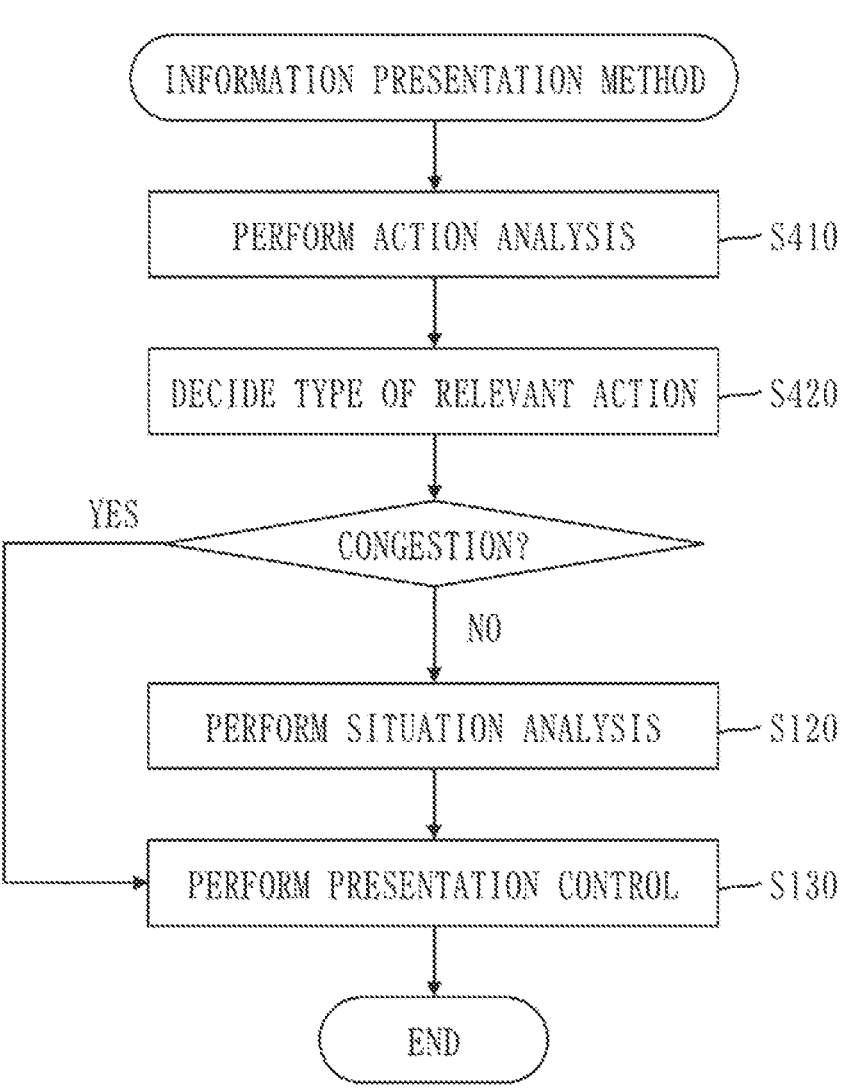
FIG. 21 is a flowchart of an information presentation method in Embodiment 4.

Back to FIG. 21, the description resumes with step S420.

In step S420, the action decision unit 112 checks the type of the relevant action.

If the type of the relevant action is "congestion of people", the acting person 203 and the action position are not identified, and it is not necessary to detect a surrounding situation and to decide a nuisance degree. Therefore, the processing proceeds to step S130.

If the type of the relevant action is other than "congestion of people", the processing proceeds to step S120.

Step S120 and step S130 are the same as corresponding steps in Embodiment 1.

Note that if the type of the relevant action is "congestion of people", in step S132 (see FIG. 14), a level determination unit 131 determines an alert level on a basis of a violating-action possibility (congestion level) instead of on a basis of the nuisance degree.

A specific example of presentation information (message) of each alert level for "congestion of people" will be indicated below.

A specific example of a message of alert level 1 is "Mind social distancing".

A specific example of a message of alert level 2 is "Keep distance to prevent infection".

A specific example of a message of alert level 3 is "Please keep distance to prevent infection".

A specific example of a message of alert level 4 is "This place is overcrowded and packed. Please keep distance".

Effect of Embodiment 4

According to Embodiment 4, a violating action of a type "congestion of people" can be detected, and an alert can be issued. Therefore, it is possible to prevent a high-density state of people. That is, Embodiment 4 is effective as a countermeasure against influenza and other infectious diseases caused by viruses.

Embodiment 5

A mode of checking whether a relevant action is corrected after alert information is presented will be described mainly regarding a difference from Embodiment 1.

*Description of Configuration*

A configuration of an information presentation system 200 is the same as a corresponding configuration (see FIGS. 1 to 3) in Embodiment 1.

*Description of Operations*

Figure 23:
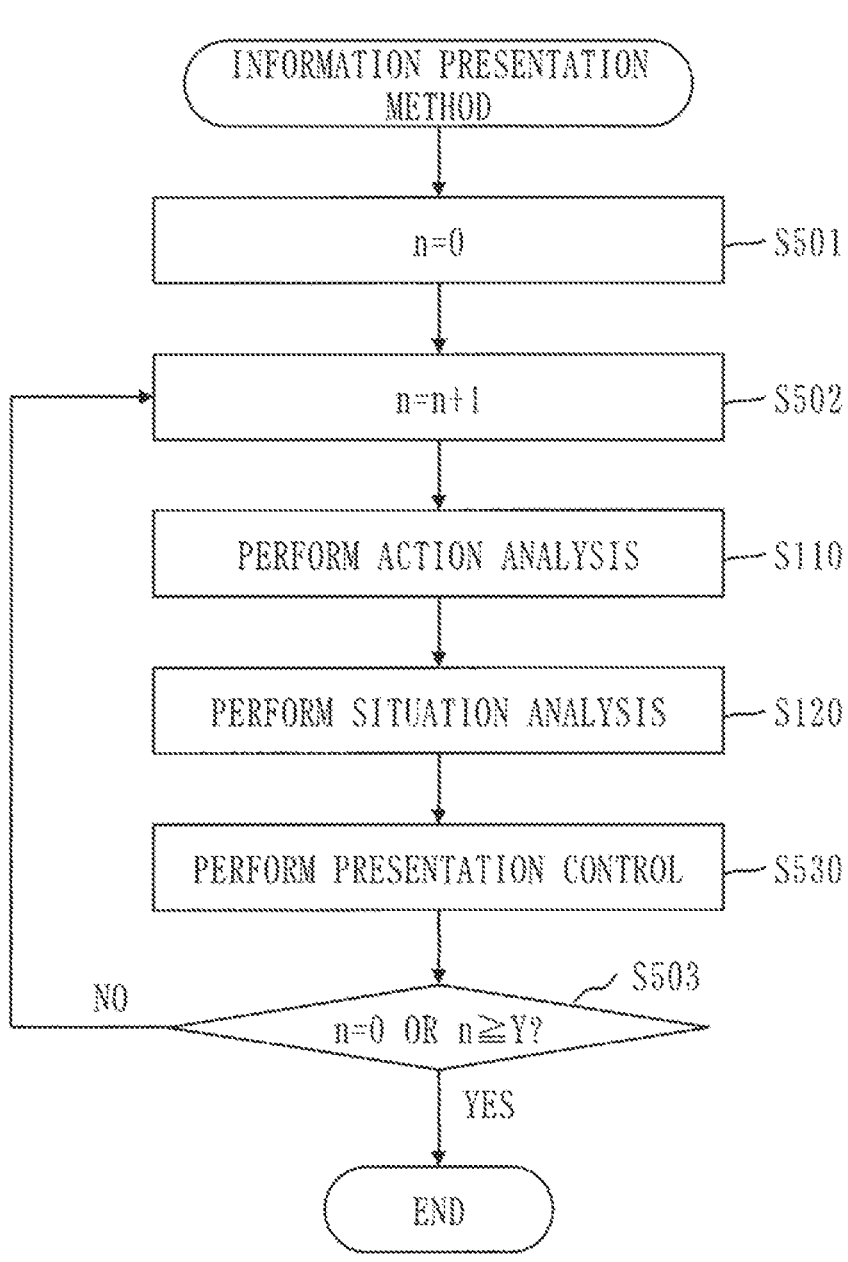
FIG. 23 is a flowchart of an information presentation method in Embodiment 5.

An information presentation method will be described with referring to FIG. 23.

In step S501, an action detection unit 111 sets a number n of presentation times to zero.

The number n of presentation times is a variable for managing a number of presentation times of the alert information. An initial value is zero.

In step S502, the action detection unit 111 adds 1 to the number n of presentation times.

Step S110 and step S120 are the same as corresponding steps in Embodiment 1.

In step S530, a presentation control unit 130 performs presentation control.

In the presentation control, a level determination unit 131 determines an alert level on a basis of the number of presentation times and a nuisance degree.

An information presentation unit 134 decides whether the number of presentation times satisfies a presentation condition, and if the number of presentation times satisfies the presentation condition, presents presentation information.

Step S530 will be described later in detail.

In step S503, the action detection unit 111 compares the number n of presentation times with a number Y of upper-limit times. A number Y of upper-limit times is a number of times that is determined in advance as an upper limit of the number of presentation times. For example, the number Y of upper-limit times is 4.

If the number n of presentation times is zero, or is the number Y of upper-limit times or more, the processing ends.

If the number n of presentation times is 1 or more to less than the number Y of upper-limit times, the processing proceeds to step S502.

Presentation control (S530) will be described with referring to FIG. 24.

In step S531, an apparatus selection unit 133 selects a presentation apparatus.

Step S531 is the same as step S131 in Embodiment 1.

In step S532, the level determination unit 131 determines an alert level on a basis of the nuisance degree of the relevant action, the coincidence-degree level of the relevant action in respect of the violating action, whether or not there is any surrounding person 204, and the number n of presentation times.

Step S532 will be described specifically. The level determination unit 131 performs processes (1) and (2). Note that a violating-action possibility based on the coincidence degree is equivalent to the coincidence degree level.

(1) The level determination unit 131 decides a final-decision probability on a basis of the nuisance degree of the relevant action and the violating-action possibility which is based on the coincidence degree, as described in Embodiment 1.

(2) The level determination unit 131 decides an alert level on a basis of the final-decision possibility, whether or not there is any surrounding person 204, and the number n of presentation times.

Figure 25:
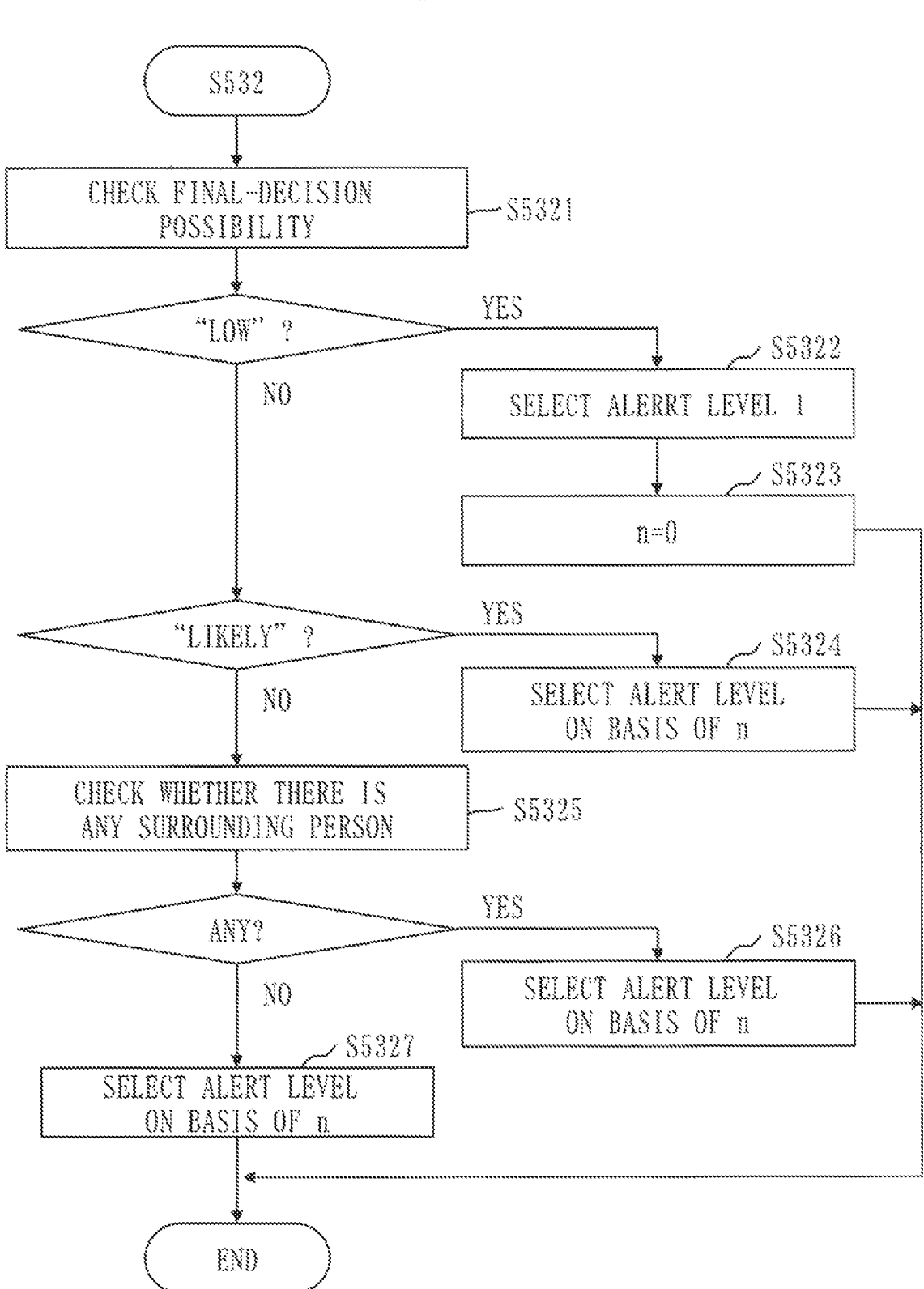
FIG. 25 is a flowchart of step S532 in Embodiment 5.

Of step S532, (2) will be described in detail with referring to FIG. 25.

In step S5321, the level determination unit 131 checks the final-decision possibility.

If the final-decision possibility is "low", the processing proceeds to step S5322.

If the final-decision possibility is "likely", the processing proceeds to step S5324.

If the final-decision possibility is "high", the processing proceeds to step S5325.

In step S5322, the level determination unit 131 selects alert level 1.

In step S5323, the level determination unit 131 sets the number n of presentation times to zero.

After step S5323, the processing ends.

In step S5324, the level determination unit 131 selects the alert level on a basis of the number n of presentation times.

Specifically, the level determination unit 131 selects an alert level corresponding to the number n of presentation times out of alert level data 198A.

FIG. 26 illustrates the alert level data 198A. The alert level data 198A is stored in a storage unit 190 in advance.

The alert level data 198A associates the number n of presentation times with the alert level according to the number n of presentation times.

For example, when the number n of presentation times is 1, that is, when alert information is to be presented as the first time, the level determination unit 131 selects alert level 1.

When the number n of presentation times is 2 or more, that is, when alert information is to be presented as the second or subsequent time, the level determination unit 131 selects alert level 2.

In step S5325, the level determination unit 131 checks whether or not there is any surrounding person 204.

If there is a surrounding person 204, the processing proceeds to step S5326.

If there is no surrounding person 204, the processing proceeds to step S5327.

In step S5326, the level determination unit 131 selects the alert level on a basis of the number n of presentation times.

Specifically, the level determination unit 131 selects an alert level corresponding to the number n of presentation times out of alert level data 198B.

FIG. 27 illustrates the alert level data 198B. The alert level data 198B is stored in the storage unit 190 in advance.

The alert level data 198B associates the number n of presentation times with the alert level according to the number n of presentation times.

For example, when the number n of presentation times is 1, that is, when alert information is to be presented as the first time, the level determination unit 131 selects alert level 1.

When the number n of presentation times is 2, that is, when the alert information is to be presented as the second time, the level determination unit 131 selects alert level 2.

When the number n of presentation times is 3 or more, that is, when alert information is to be presented as the third or subsequent time, the level determination unit 131 selects alert level 3.

In step S5327, the level determination unit 131 selects the alert level on a basis of the number n of presentation times.

Specifically, the level determination unit 131 selects an alert level corresponding to the number n of presentation times out of alert level data 198C.

FIG. 28 illustrates the alert level data 198C. The alert level data 198C is stored in the storage unit 190 in advance.

The alert level data 198C associates the number n of presentation times with the alert level according to the number n of presentation times.

For example, when the number n of presentation times is 1, that is, when alert information is to be presented as the first time, the level determination unit 131 selects alert level 1.

When the number n of presentation times is 2, that is, when the alert information is to be presented as the second time, the level determination unit 131 selects alert level 2.

When the number n of presentation times is 3, that is, when alert information is to be presented as the third time, the level determination unit 131 selects alert level 3.

When the number n of presentation times is 4 or more, that is, when alert information is to be presented as the fourth or subsequent time, the level determination unit 131 selects alert level 4.

Figure 24:
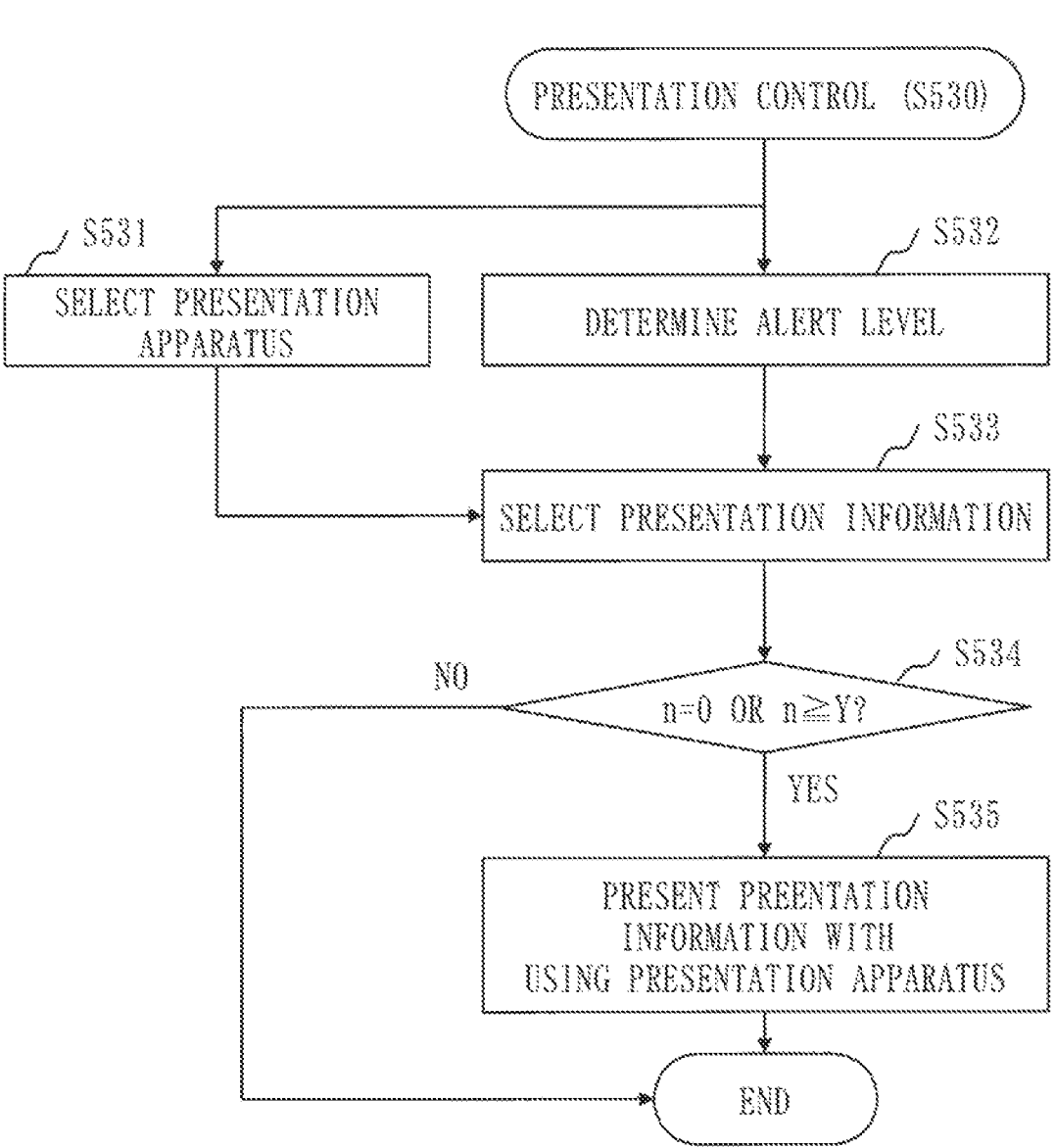
FIG. 24 is a flowchart of presentation control (S530) in Embodiment 5.

Back to FIG. 24, the description resumes with step S533.

In step S533, an information selection unit 132 selects presentation information corresponding to the alert level.

Step S533 is the same as step S133 in Embodiment 1.

In step S534, the information presentation unit 134 checks the number n of presentation times.

If the number n of presentation times is zero, or is the number Y of upper-limit times or more, the processing proceeds to step S535.

If the number n of presentation times is 1 or more to less than the number Y of upper-limit times, presentation information is not presented, and the processing ends.

In step S535, the information presentation unit 134 presents presentation information with using a presentation apparatus.

Step S535 is the same as step S134 in Embodiment 1.

Effect of Embodiment 5

According to Embodiment 5, whether or not a relevant action is corrected after alert information is presented can be checked.

If the relevant action is not corrected, the information presentation system 200 presents alert information with a higher alert degree than the alert information which was presented the last time.

That is, if the violating-action possibility does not become "low" after the initial alert information is presented, the information presentation system 200 presents the alert information repeatedly. Therefore, even if the action is not corrected in response to the first alert, issuing an alert a plurality of number of times can be expected to increase the possibility of having the action corrected.

Since the alert information to be presented intensifies stepwise, it becomes easier for an acting person 203 to accept the alert information, and the possibility of having the action corrected can be expected to increase. The reason for this is as follows. In a case where the acting person 203 is not aware of his or her performing a violating action, if a strong alert is given to the acting person 203 from the beginning, the acting person 203 cannot understand why the alert is given to him or her, and may feel unpleasant. Thus, alert information is presented by raising the alert degree stepwise starting with alert information with a low alert degree, in order that the acting person 203 gradually notices that he or she is performing a violating action. This allows the acting person 203 to accept the alert information easily, and the possibility that the acting person 203 corrects the action voluntarily increases.

Supplemental to Embodiments

Figure 29:
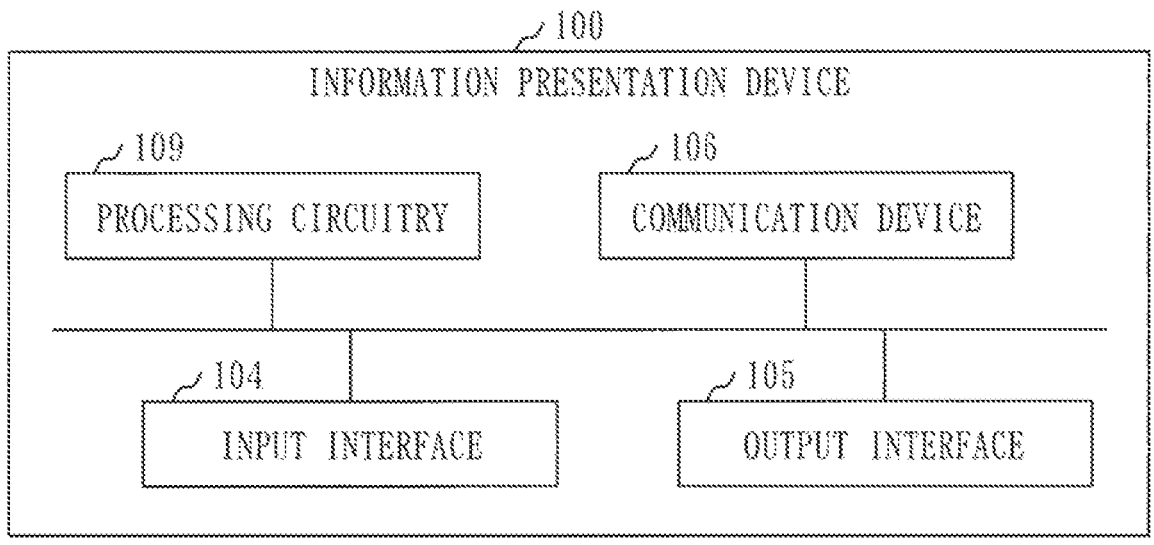
FIG. 29 is a hardware configuration diagram of the information presentation device 100 in the embodiments.

A hardware configuration of the information presentation device 100 will be described with referring to FIG. 29.

The information presentation device 100 is provided with processing circuitry 109.

The processing circuitry 109 is hardware that implements the action analysis unit 110, the situation analysis unit 120, and the presentation control unit 130.

The processing circuitry 109 may be dedicated hardware, or may be a processor 101 that implements a program stored in a memory.

When the processing circuitry 109 is dedicated hardware, the processing circuitry 109 is, for example, one or a combination of a single circuit, a composite circuit, a programmed processor, a parallel-programmed processor, an ASIC, and an FPGA.

Note that ASIC stands for Application Specific Integrated Circuit.

Note that FPGA stands for Field-Programmable Gate Array.

The information presentation device 100 may be provided with a plurality of processing circuits that substitute for the processing circuitry 109.

In the processing circuitry 109, some of the functions may be implemented by dedicated hardware, and the remaining functions may be implemented by software or firmware.

In this manner, the functions of the information presentation device 100 can be implemented by one or a combination of hardware, software, and firmware.

Each embodiment is an exemplification of a preferred mode, and is not intended to limit the technical scope of the present disclosure. Each embodiment may be practiced partly, or may be practiced by combination with another embodiment. The procedures described with using flowcharts or the like may be changed as necessary.

The information presentation device 100 may be implemented by a plurality of devices.

A term "unit" signifying an element of the information presentation device 100 may be replaced by a "stage", a "process", a "circuit", or "circuitry".

REFERENCE SIGNS LIST

100: information presentation device; 101: processor; 102: main storage device; 103: auxiliary storage device; 104: input interface; 105: output interface; 106: communication device; 109: processing circuitry; 110:

action analysis unit; 111: action detection unit; 112: action decision unit; 120: situation analysis unit; 121: situation detection unit; 122: notice acceptance unit; 123: nuisance degree decision unit; 130: presentation control unit; 131: level determination unit; 132: information selection unit; 133: apparatus selection unit; 134: information presentation unit; 190: storage unit; 191: characteristic data group; 192: violating-action possibility data; 193: surrounding condition data group; 194A: facial-expression-oriented nuisance degree data; 194B: action-oriented nuisance degree data; 194C: notice-oriented nuisance degree data; 194D: synthetic nuisance degree data; 195: final-decision possibility data; 196: alert level data; 197: alert information data; 198: alert level data; 200: information presentation system; 201: monitoring place; 202: user; 203: acting person; 204: surrounding person; 210: monitoring apparatus; 211: camera; 212: microphone; 220: output apparatus; 221: display; 222: speaker; 223: projector; 224: lighting apparatus; 231: mobile terminal.

The invention claimed is:

1. A nuisance degree decision system comprising:
processing circuitry to
   perform image processing, on video data captured by a camera of a public place, to detect individuals in the video data and classify one of the detected individuals as an acting person,
   detect a relevant action performed by the acting person that may disturb others based on information extracted from the video data,
   detect an action position, which is equivalent to a position inside the public space where the relevant action was performed,
   perform image processing on the video data to determine other individuals, different than the acting person, who are within a predetermined proximity to the action position, and recognize facial expressions of the determined other individuals,
   calculate a nuisance degree of the relevant action on a basis of the recognized facial expressions, and
   in response to the nuisance degree exceeding a threshold, causing an output apparatus to output a message to at least the acting person requesting the relevant action be stopped.

2. An information presentation system comprising:
the nuisance degree decision system according to claim 1,
wherein the processing circuitry
   determines an alert level on a basis of the nuisance degree, and
   outputs the message corresponding to the alert level with using an output device installed at the public space.

3. The information presentation system according to claim 2,
   wherein the processing circuitry
   analyzes the video data so as to detect a position of the acting person, and
   takes the position of the acting person as the action position.

4. The information presentation system according to claim 2,
   wherein the processing circuitry is configured to accept nuisance notices transmitted from mobile terminals of individuals in the public space, and
   decides the nuisance degree on a basis of a number of nuisance notices accepted from the determined other individuals.

5. The information presentation system according to claim 2,
   wherein the processing circuitry
   calculates a coincidence degree of the relevant action in respect of the violating action on a basis of characteristic information of the violating action and characteristic information of the relevant action which is obtained from the monitor data, and decides a coincidence-degree level on a basis of the calculated coincidence degree, and
   determines the alert level on a basis of the nuisance degree and the coincidence-degree level.

6. The information presentation system according to claim 5,
   wherein the processing circuitry
   detects, based on image processing performed on the video data, whether or not there is any individual other than the acting person within a predetermined distance of the action position, and
   determines the alert level on a basis of the nuisance degree, the coincidence-degree level, and whether or not there is any individual other than the acting person within the predetermined distance to the action position.

7. The information presentation system according to claim 2,
   wherein the processing circuitry
   selects presentation information corresponding to the alert level from among a plurality of pieces of alert information,
   detects the relevant action as one of the plurality of types of disturbance-inducing actions, and
   selects alert information corresponding to the alert level and a type of the relevant action which is a types of a violating action corresponding to the relevant action, as the presentation information, and
   outputs the selected alert information via the output apparatus.

8. The information presentation system according to claim 7,
   wherein the public space is provided with a plurality of types of output apparatuses being installed, and
   wherein the processing circuitry
   selects the output apparatus to be used to output the selected alert information from among the plurality of types of output apparatuses, on a basis of at least either one of the action position and a detected surrounding situation, and
   selects alert information corresponding to the alert level, a type of the relevant action, and the type of the plurality of a types of output apparatuses selected as the output apparatus.

9. The information presentation system according to claim 2,
   wherein the public space is provided with a plurality of types of output apparatuses being installed, and
   wherein the processing circuitry selects the output apparatus to be used to output the message from among the plurality of types of output apparatuses on a basis of at least one of the action position and a detected surrounding situation.

10. The information presentation system according to claim 2,
   wherein the processing circuitry detects the relevant action as one of a of types of violating actions, and
   wherein when two or more relevant actions corresponding to two or more types of violating actions are detected, the processing circuitry calculates, for each relevant action, a coincidence degree of the relevant action and characteristic information of each of the plurality of a violating actions, and decides a relevant action having a highest coincidence degree as a relevant action to take priority.

11. The information presentation system according to claim 10, wherein when there are two or more relevant actions having the highest coincidence degree, the processing circuitry decides one of the two or more relevant actions having the highest coincidence degree as the relevant action to take priority, on a basis of individual types of the two or more relevant actions having the highest coincidence degree.

12. The information presentation system according to claim 2, wherein the processing circuitry analyzes sound data obtained by sound pickup at the public space, and detects the relevant action as an utterance by the acting person as that is noise, as the violating action, and determines a sound pickup position in the public space as the action position.

13. The information presentation system according to claim 12, wherein the processing circuitry analyzes the sound data to measure a sound volume of a speaking voice, and detects the relevant action on a basis of the measured sound volume, decides a sound volume level of the relevant action on a basis of a sound volume of the relevant action, and determines the alert level on a basis of the nuisance degree and the sound volume level.

14. The information presentation system according to claim 13, wherein the processing circuitry performs image processing on the video data to detect whether or not there is any detected individual other than the acting person located around the sound pickup position, and determines the alert level on a basis of the nuisance degree, the sound volume level, and whether or not there is any detected individual other than the acting person.

15. The information presentation system according to claim 2, wherein the processing circuitry performs image processing to analyze the video data to detect a number of individual people reflected in a visual image, detects whether the relevant action is a type of violating action representing congestion of people on a basis of a number of detected people, wherein, in response to the relevant action being is detected as a type of violating action representing the congestion of people, the processing circuitry decides a congestion level of the relevant action on a basis of the number of detected people, and determines the alert level on a basis of the congestion level, and wherein, in response to the relevant action being detected as a different type of violating action than one representing the congestion of people, the processing circuitry determines the alert level on a basis of the nuisance degree.

16. The information presentation system according to claim 2, wherein the processing circuitry determines the alert level on a basis of the nuisance degree and a number of times of outputting the message.

17. The information presentation system according to claim 16, wherein the processing circuitry causes the message to be outputted when the number of outputting times satisfies a presentation condition, and does not cause the message to be outputted when the number of presentation times does not satisfy the presentation condition.

18. An information presentation method comprising:

performing image processing, on video data captured by a camera of a public place, to detect individuals in the video data and classify one of the detected individuals as an acting person;

detecting a relevant action performed by the acting person that may disturb others based on information extracted from the video data;

detecting an action position, which is equivalent to a position inside the public space where the relevant action was performed;

performing image processing on the video data to determine other individuals, different than the acting person, who are within a predetermined proximity to the action position, and recognize facial expressions of the determined other individuals;

calculating a nuisance degree of the relevant action on a basis of the recognized facial expressions; and in response to the nuisance degree exceeding a threshold, causing an output apparatus installed in the public space to output a message to at least the acting person requesting the relevant action be stopped, wherein a manner of outputting the output message corresponds to an alert level determined on a basis of the nuisance degree.

19. A non-transitory computer-readable recording medium recorded with an information presentation program to cause a computer to execute:

performing image processing, on video data captured by a camera of a public space, to detect individuals in the video data and classify one of the detected individuals as an acting person;

detecting a relevant action performed by the acting person that may disturb others based on information extracted from the video data;

detecting an action position, which is equivalent to a position inside the public space where the relevant action was performed;

performing image processing on the video data to determine other individuals, different than the acting person, who are within a predetermined proximity to the action position, and recognize facial expressions of the determined other individuals;

calculating a nuisance degree of the relevant action on a basis of the recognized facial expressions; and in response to the nuisance degree exceeding a threshold, causing an output apparatus installed in the public space to output a message to at least the acting person requesting the relevant action be stopped, wherein a manner of outputting the output message corresponds to an alert level determined on a basis of the nuisance degree.

* * * * *